March 21, 1939. M. L. JONES 2,151,033
FOLDING PARTITION
Filed July 14, 1934 19 Sheets-Sheet 2
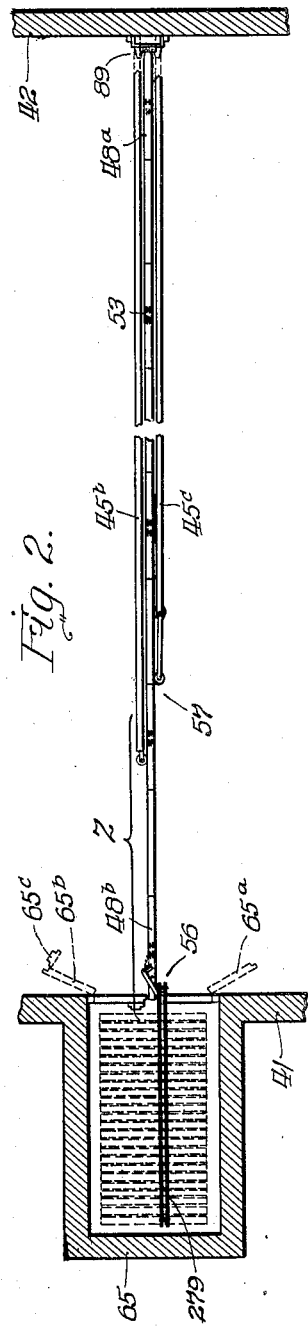
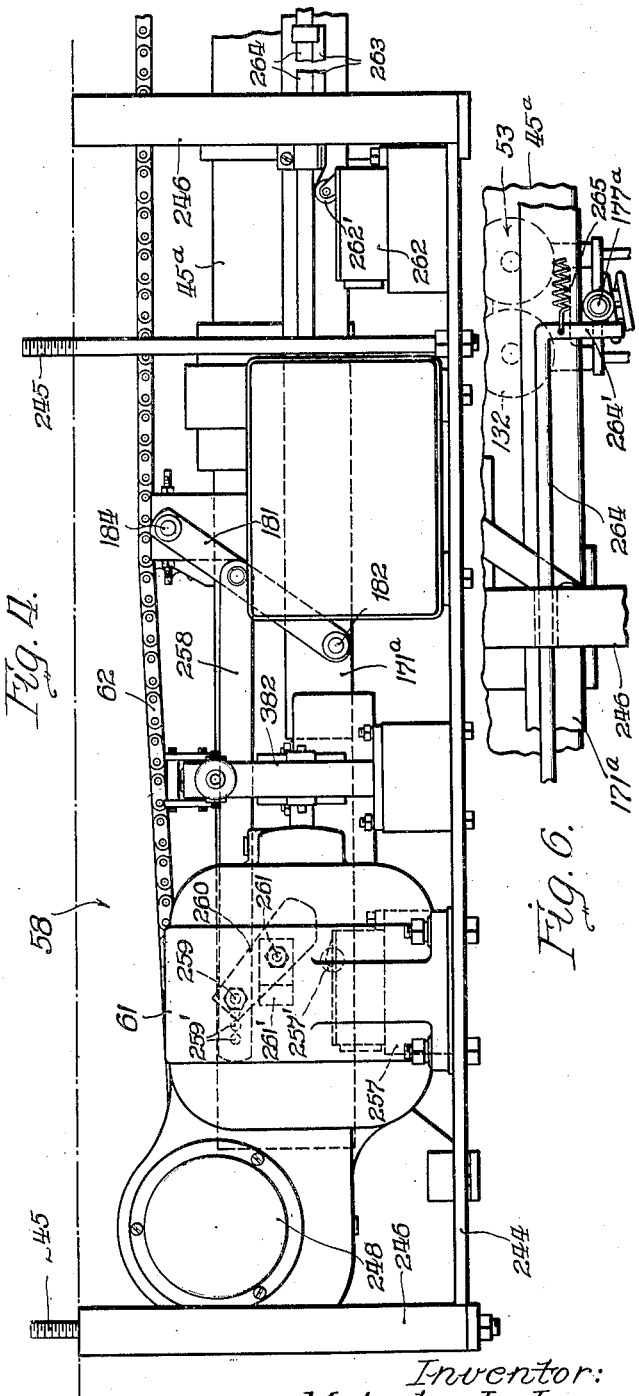
Inventor:
Malcolm L. Jones
By: Brown, Jackson, Buttcher & Dienner
Atty March 21, 1939. M. L. JONES 2,151,033
FOLDING PARTITION
Filed July 14, 1934 19 Sheets-Sheet 3
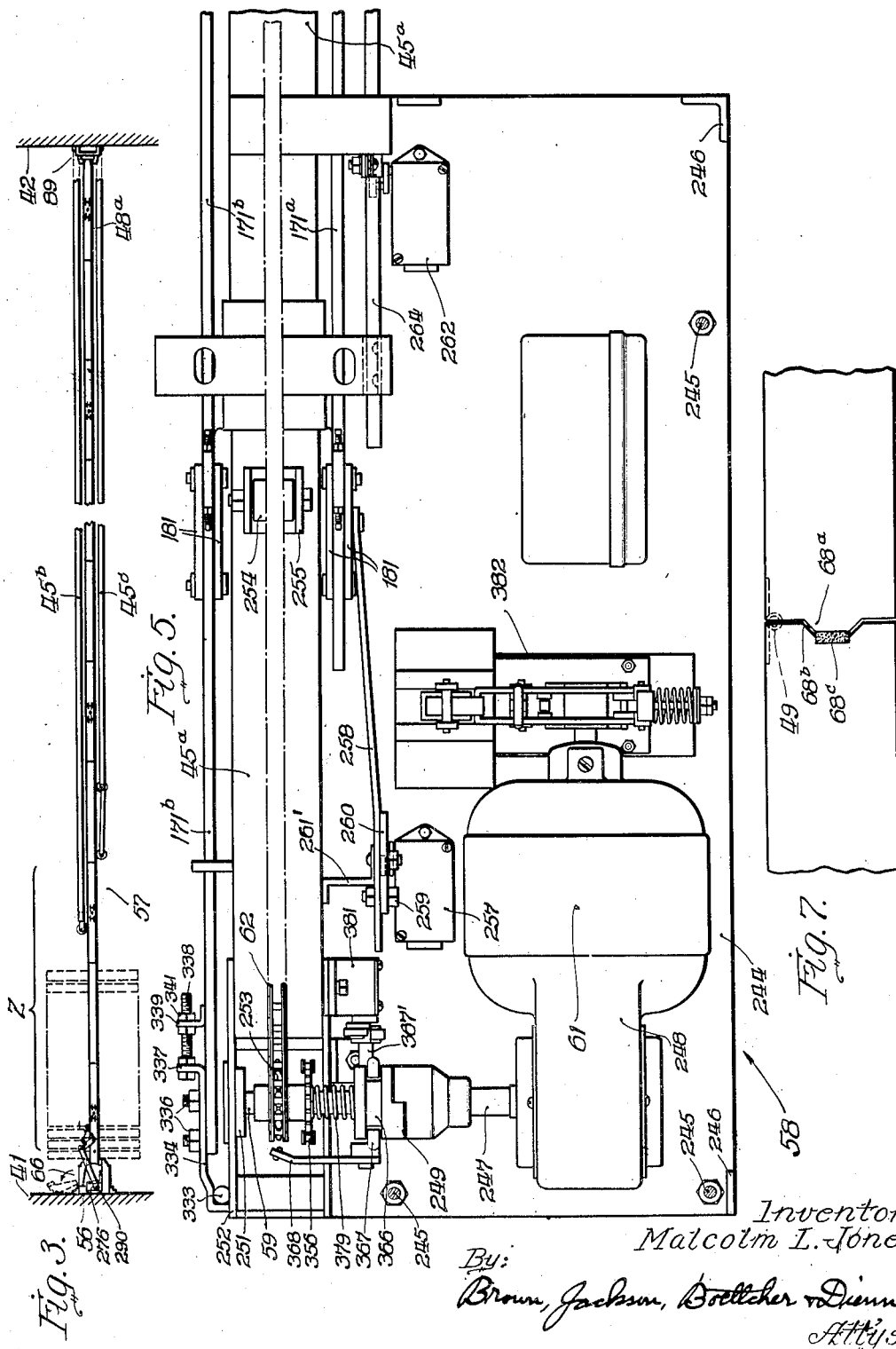

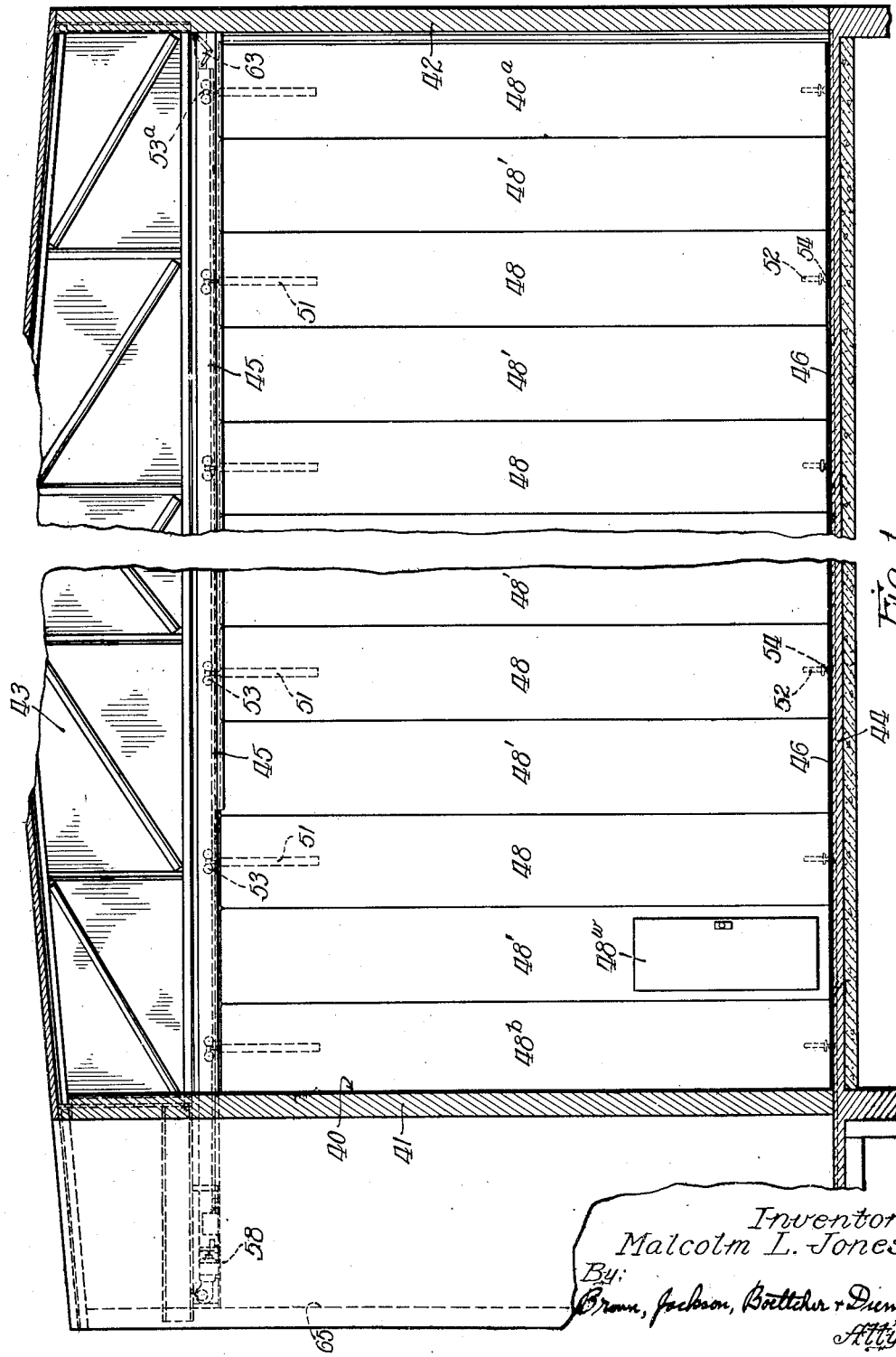

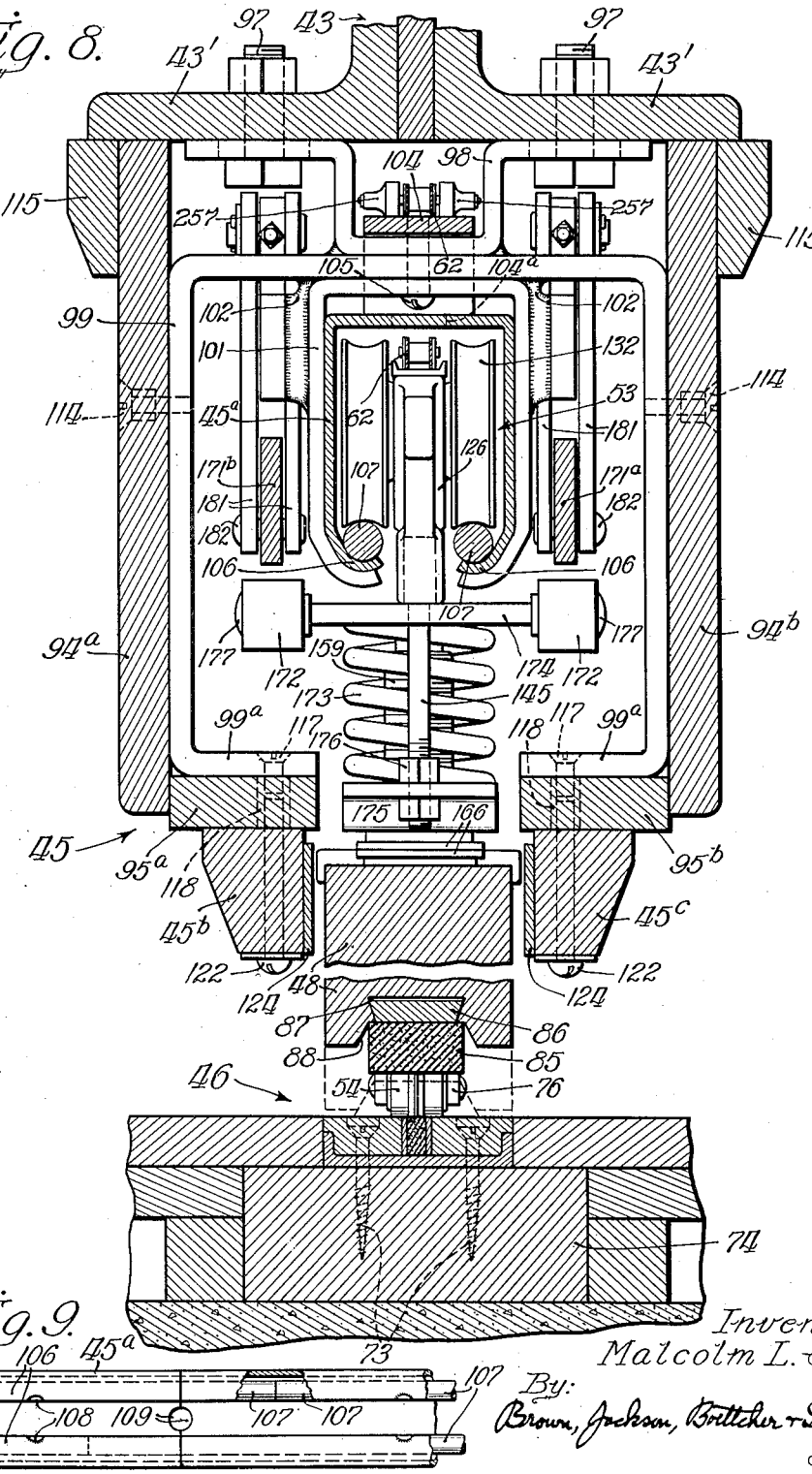

March 21, 1939.  M. L. JONES  2,151,033
FOLDING PARTITION
Filed July 14, 1934   19 Sheets-Sheet 5
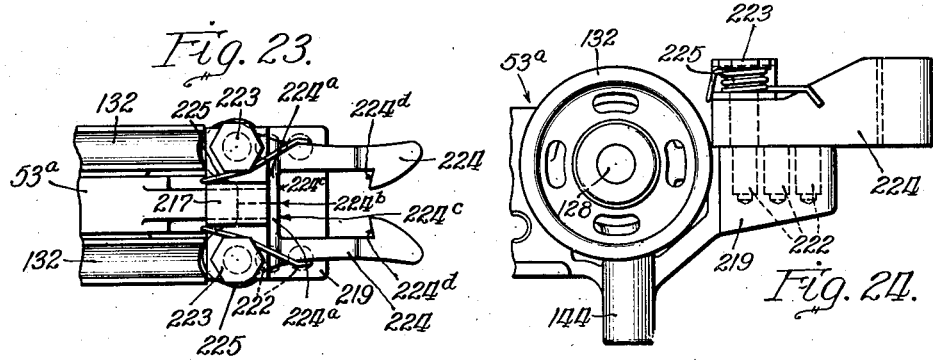
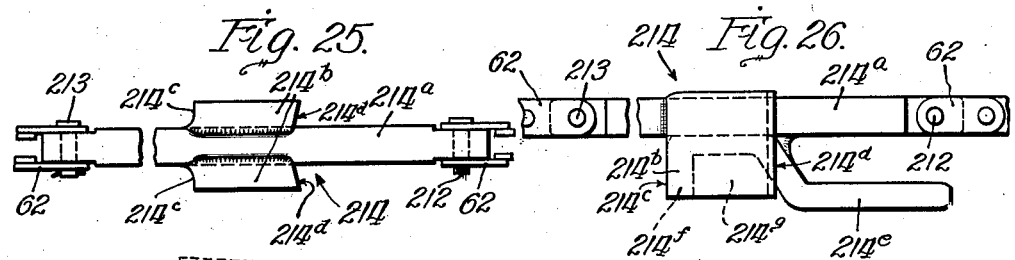
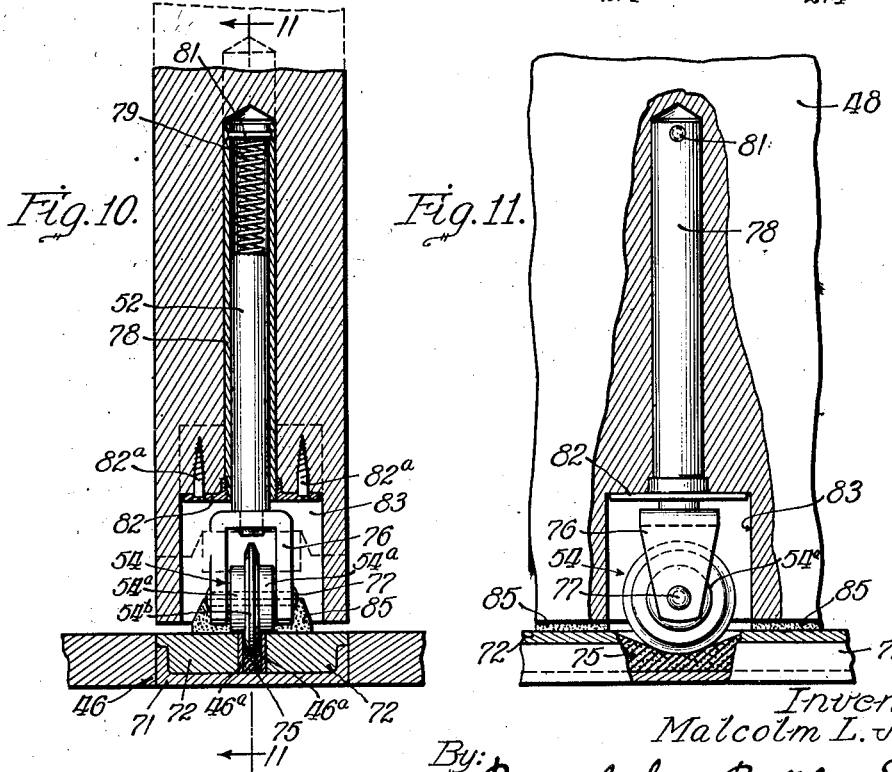
Inventor:
Malcolm L. Jones
By: Brown, Jackson, Boettcher & Dienner
Attys.

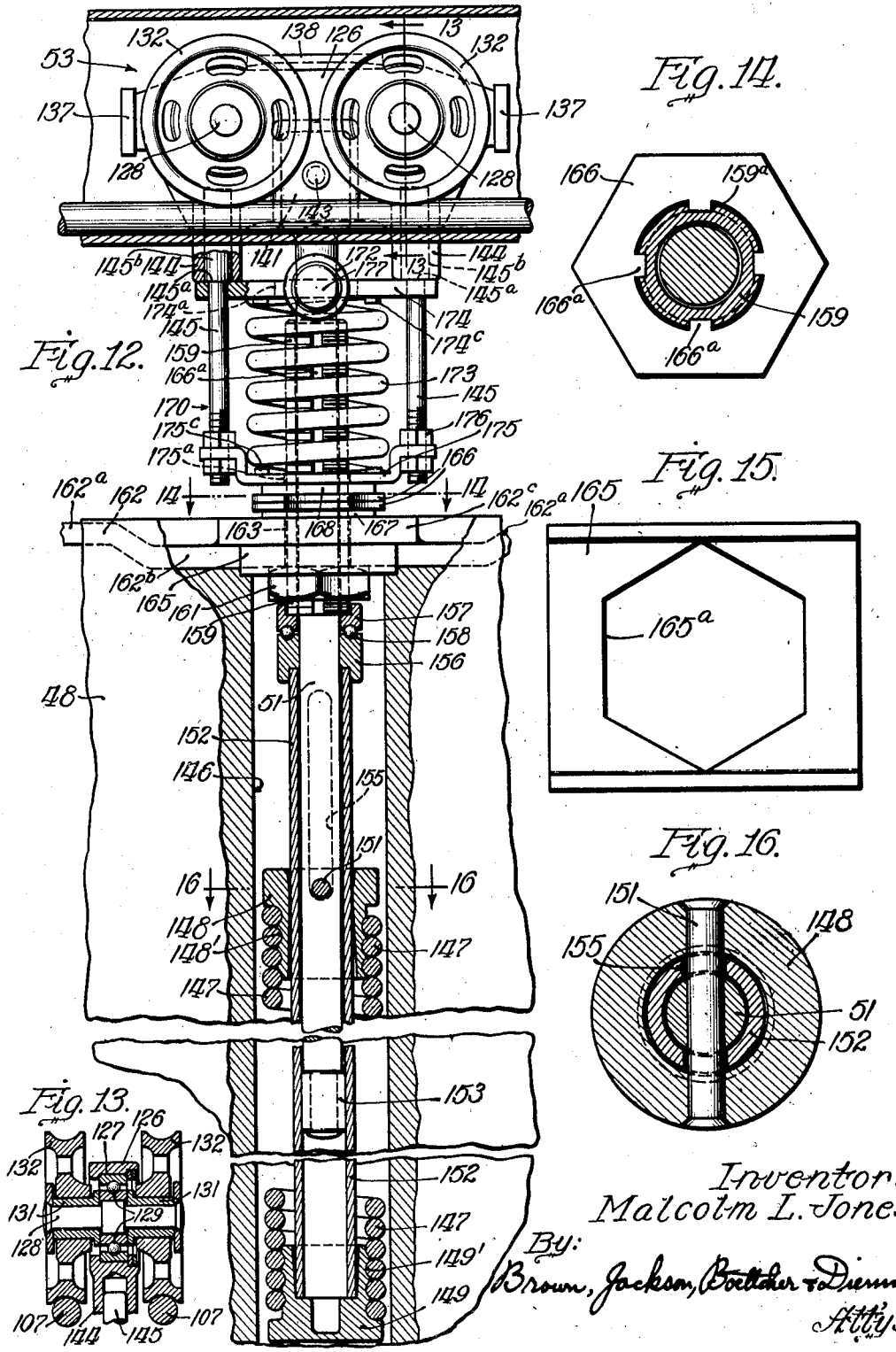

March 21, 1939. M. L. JONES 2,151,033
FOLDING PARTITION
Filed July 14, 1934 19 Sheets-Sheet 7
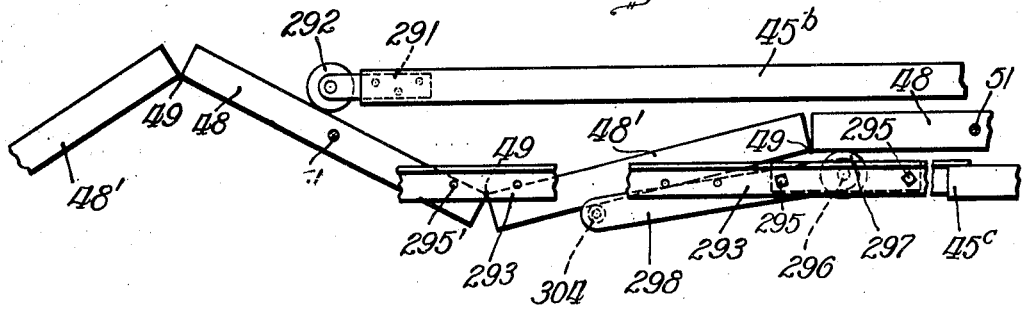
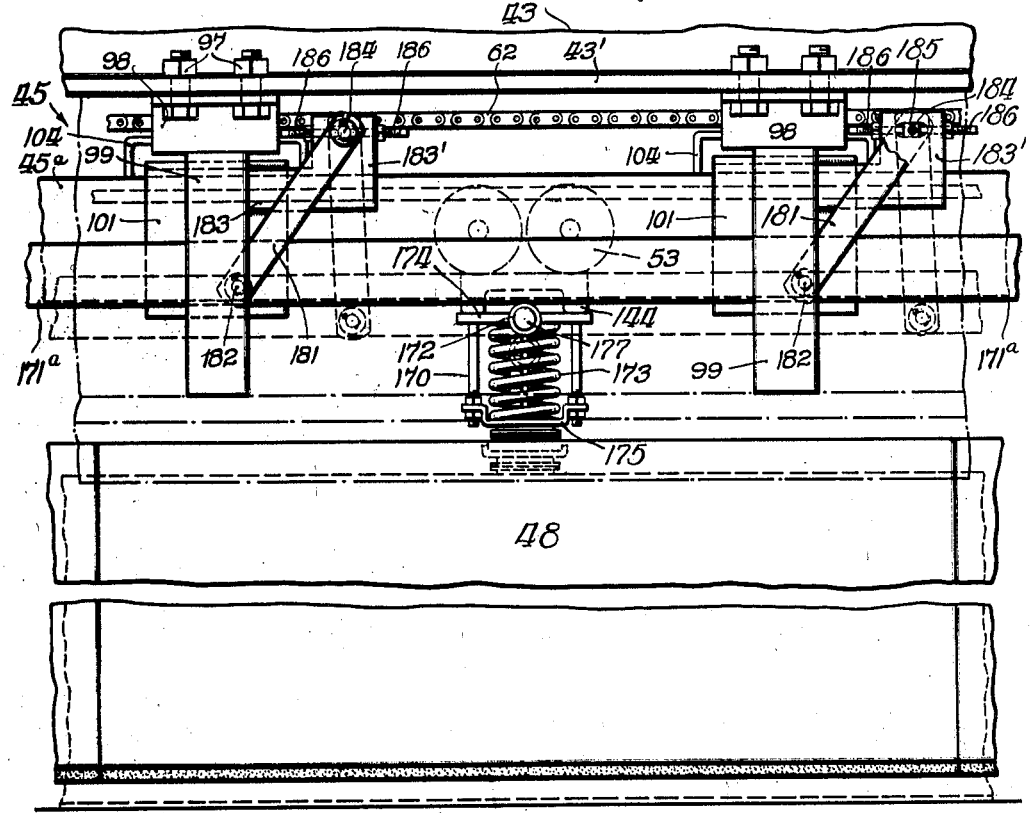
Inventor:
Malcolm L. Jones
By: Brown, Jackson, Boettcher & Dienner
Attys.

March 21, 1939.　　　M. L. JONES　　　2,151,033
FOLDING PARTITION
Filed July 14, 1934　　19 Sheets-Sheet 8

Inventor:
Malcolm L. Jones
By: Brown, Jackson, Boettcher & Diemer
Attys

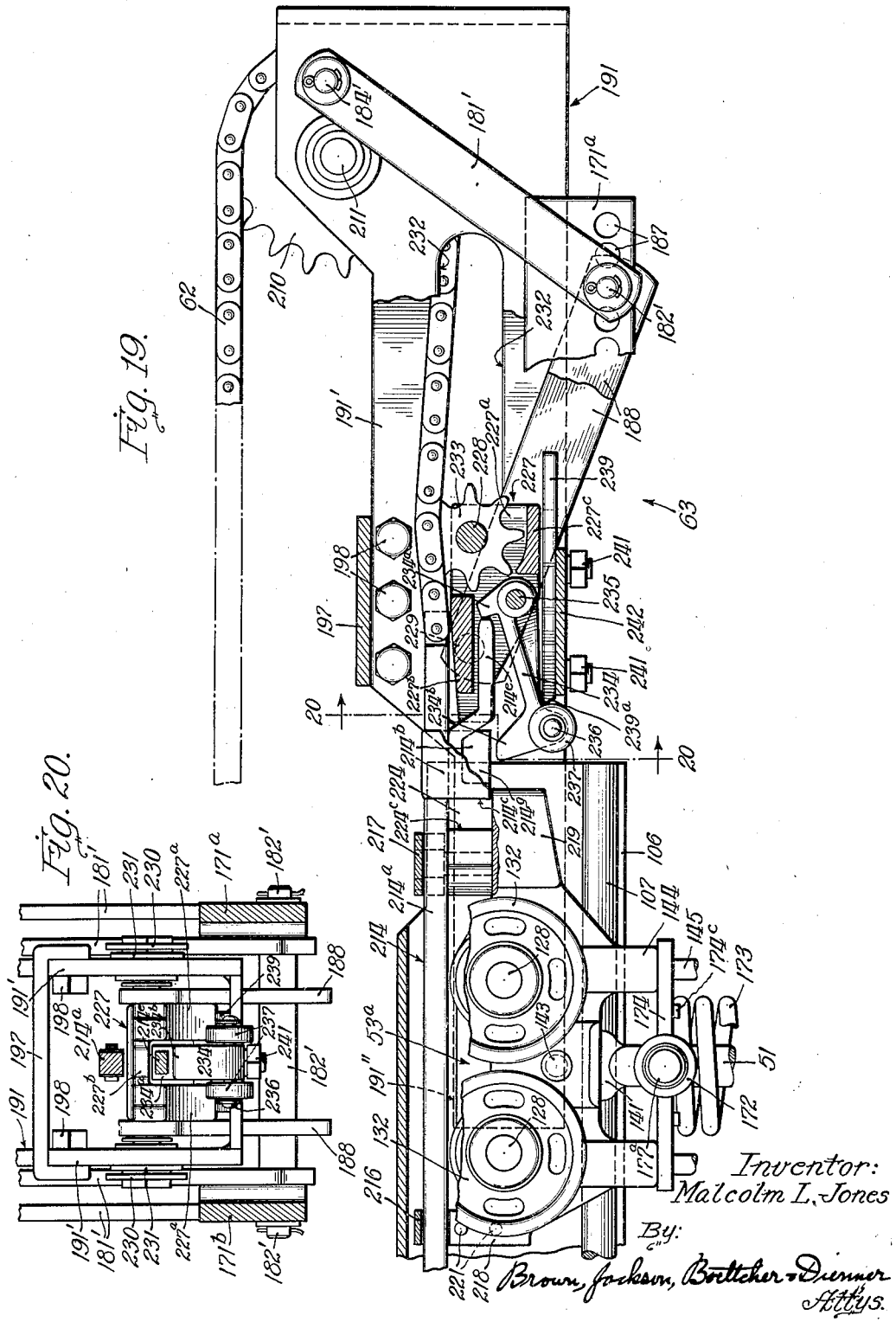

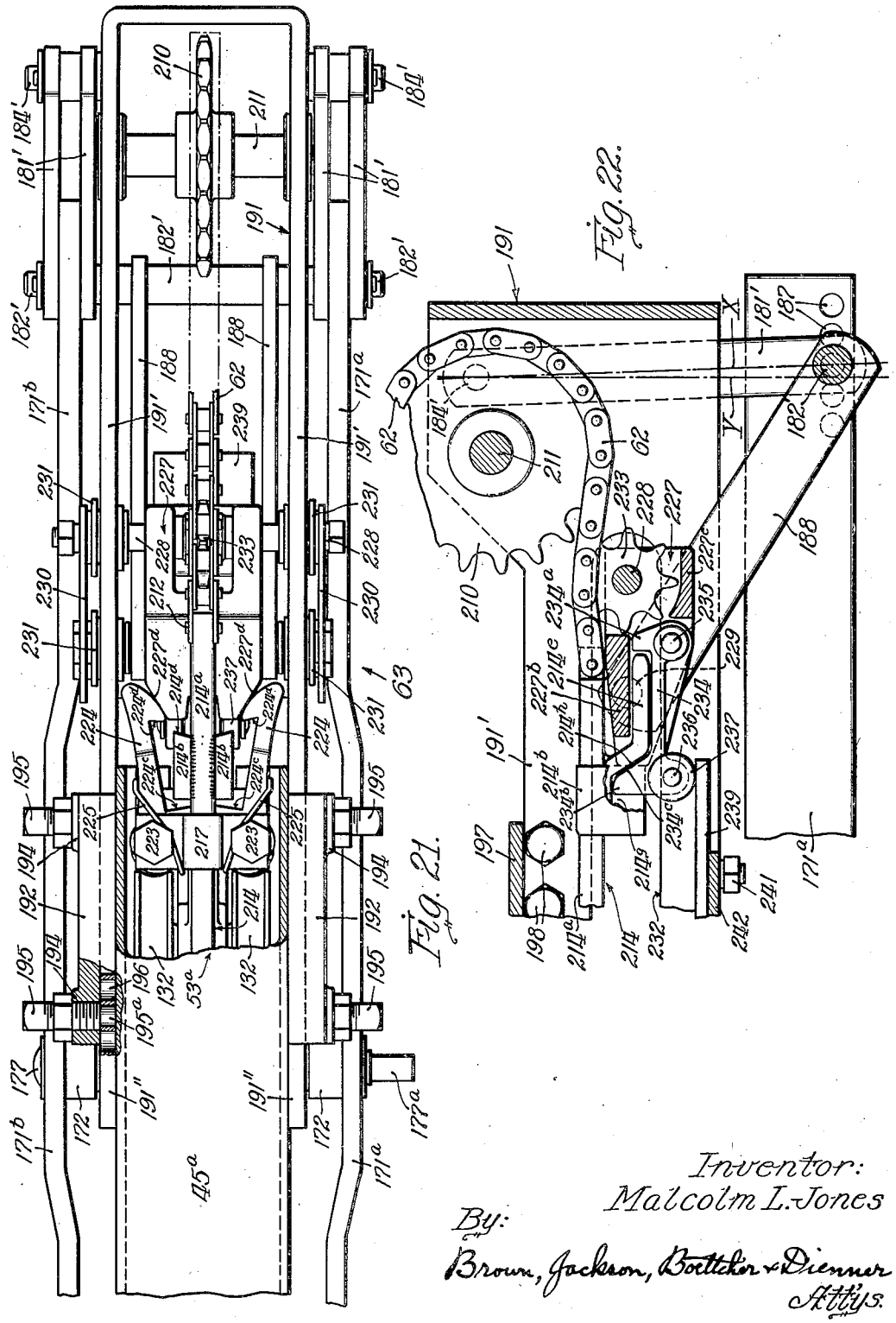

March 21, 1939.  M. L. JONES  2,151,033
FOLDING PARTITION
Filed July 14, 1934   19 Sheets-Sheet 11

Inventor:
Malcolm L. Jones
By:
Brown, Jackson, Boettcher & Dienner
Attys.

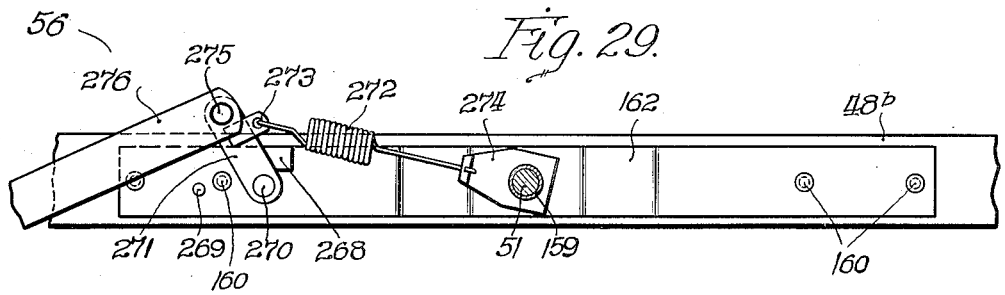
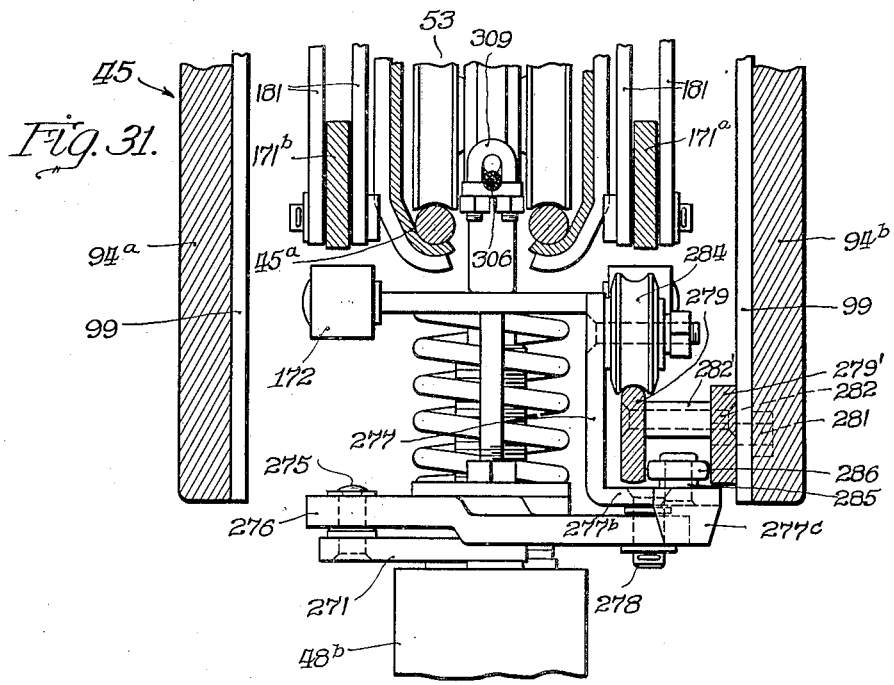
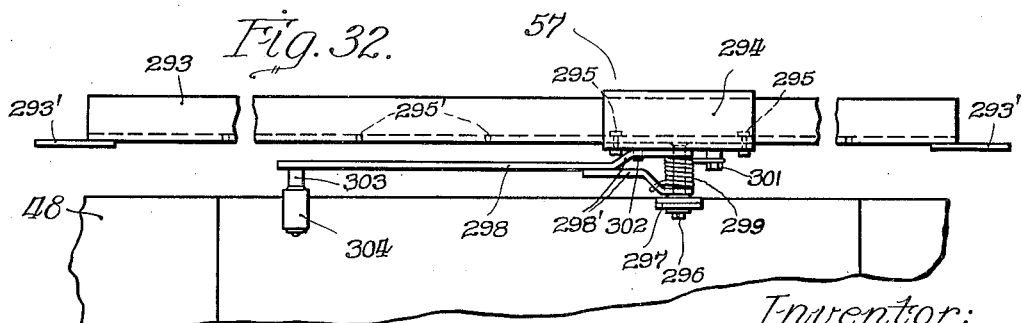

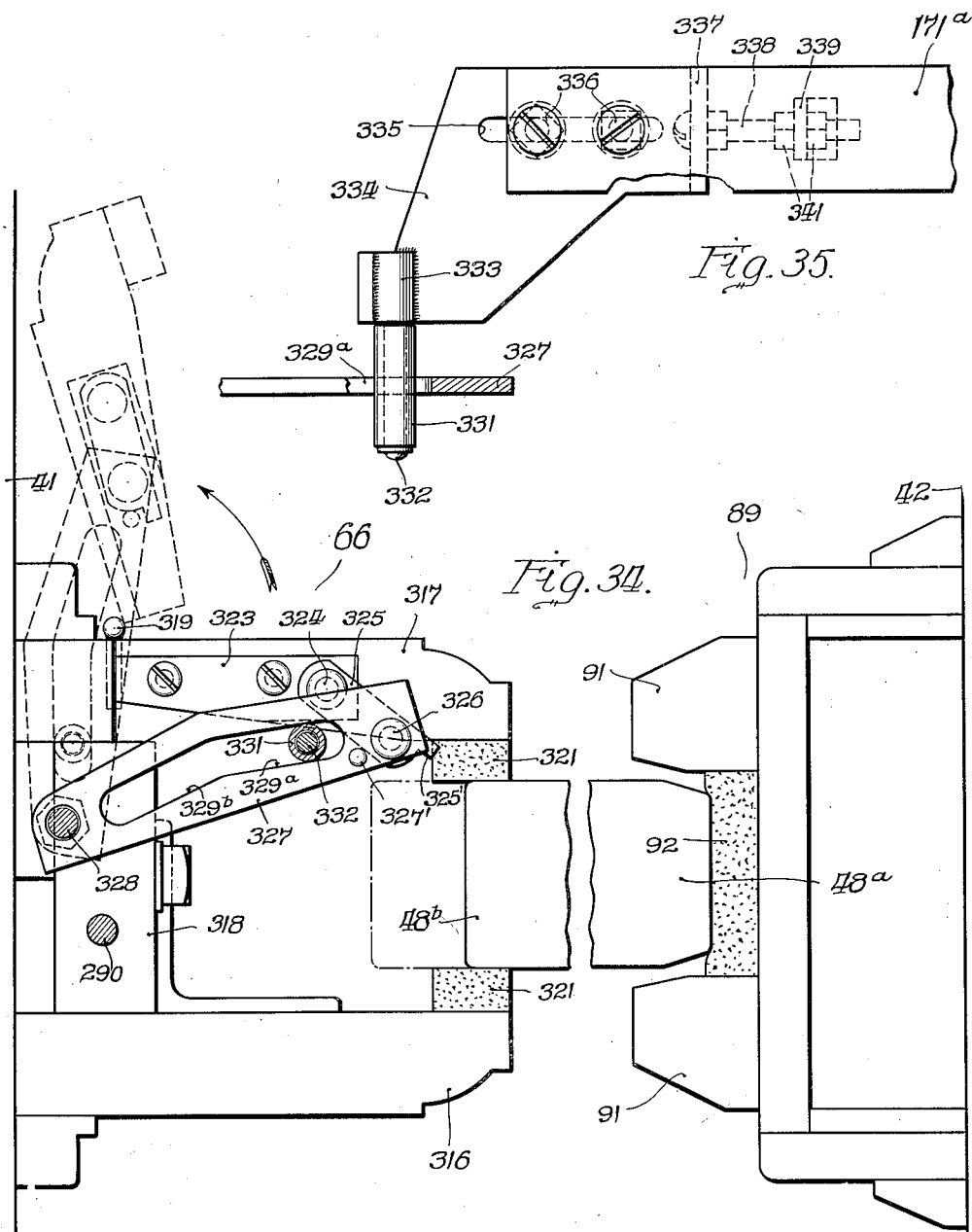

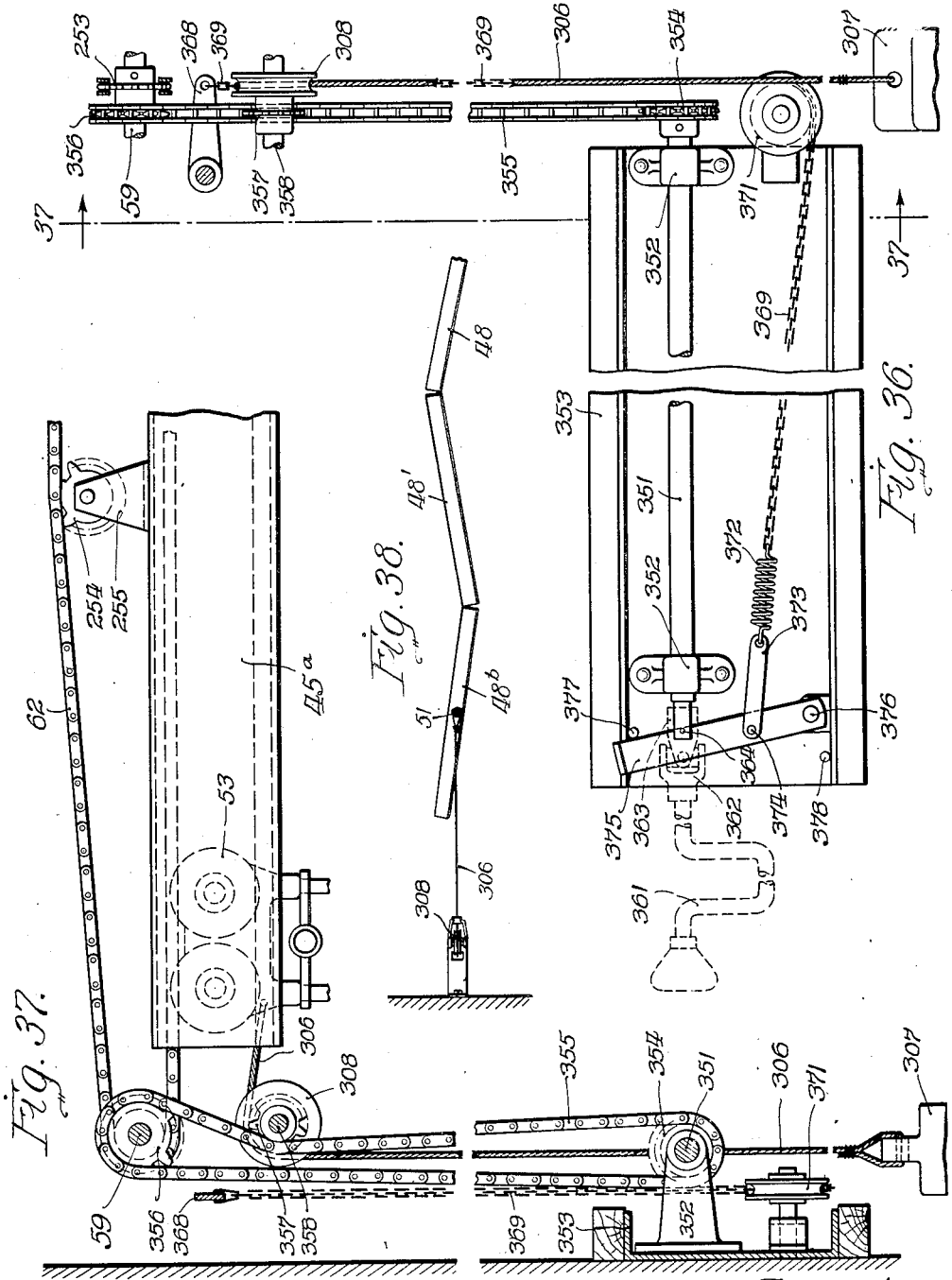

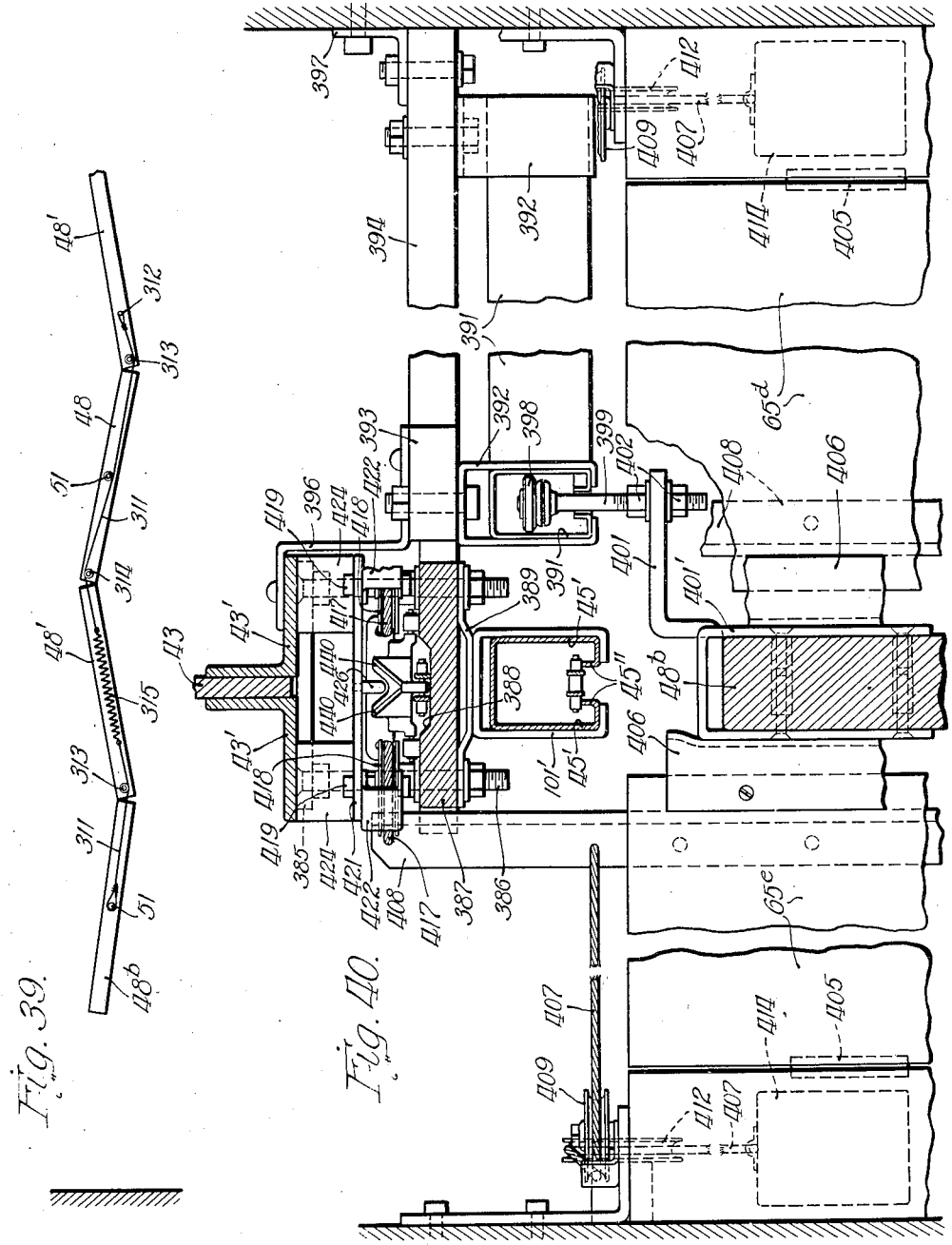

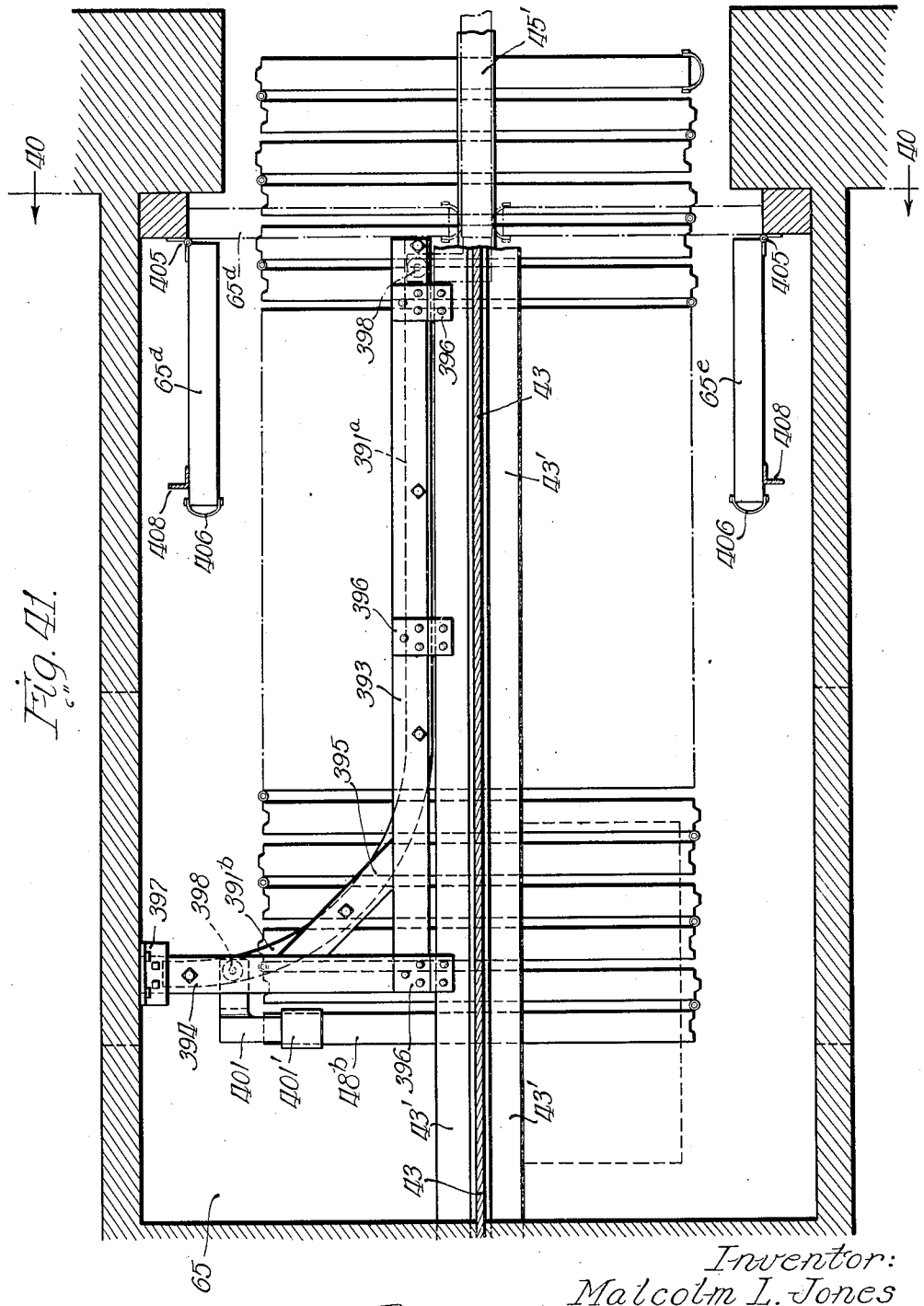

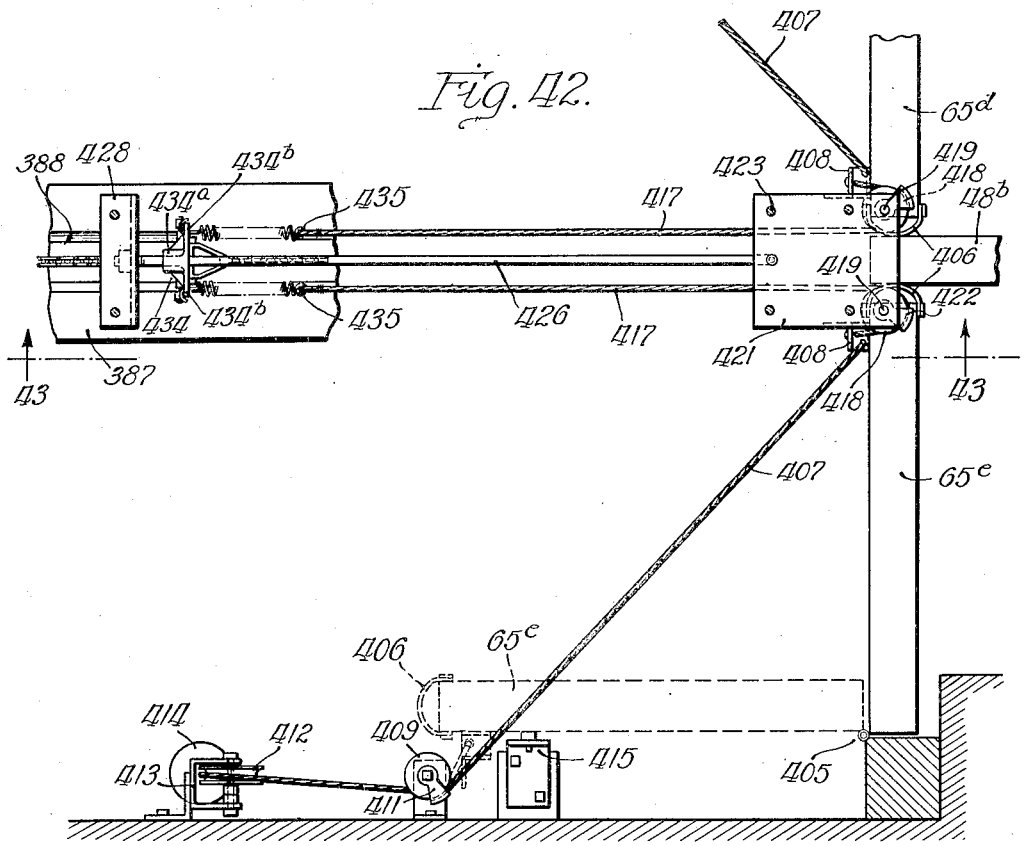
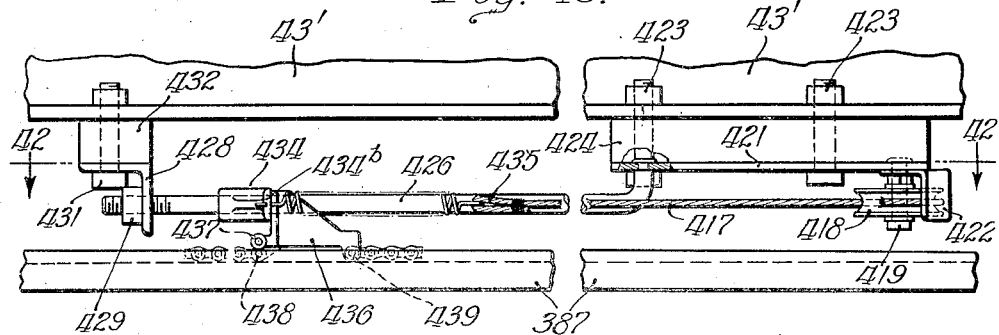

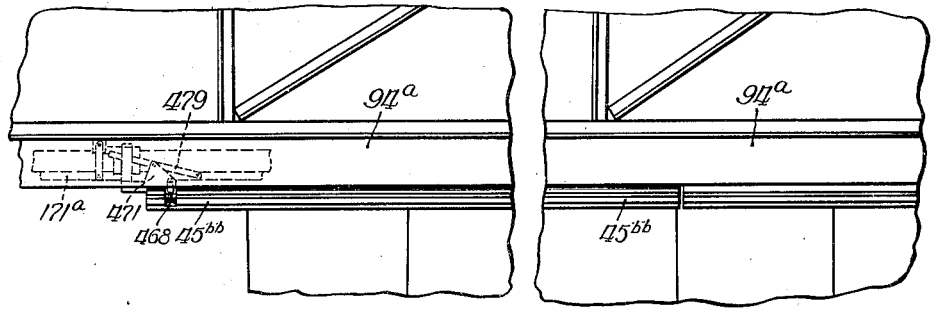
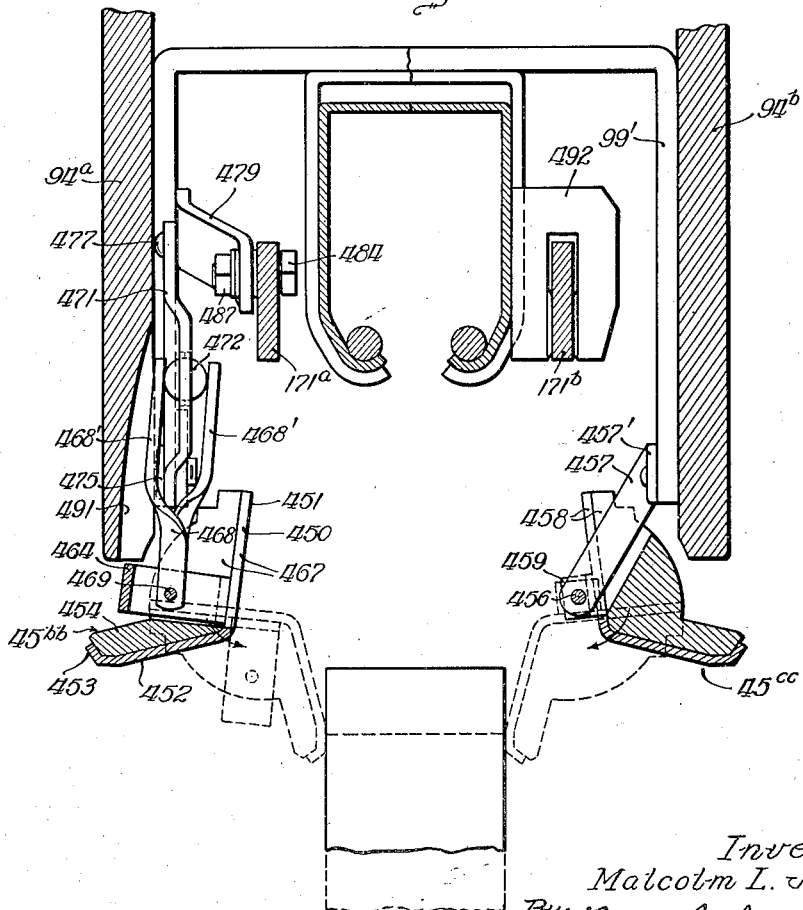

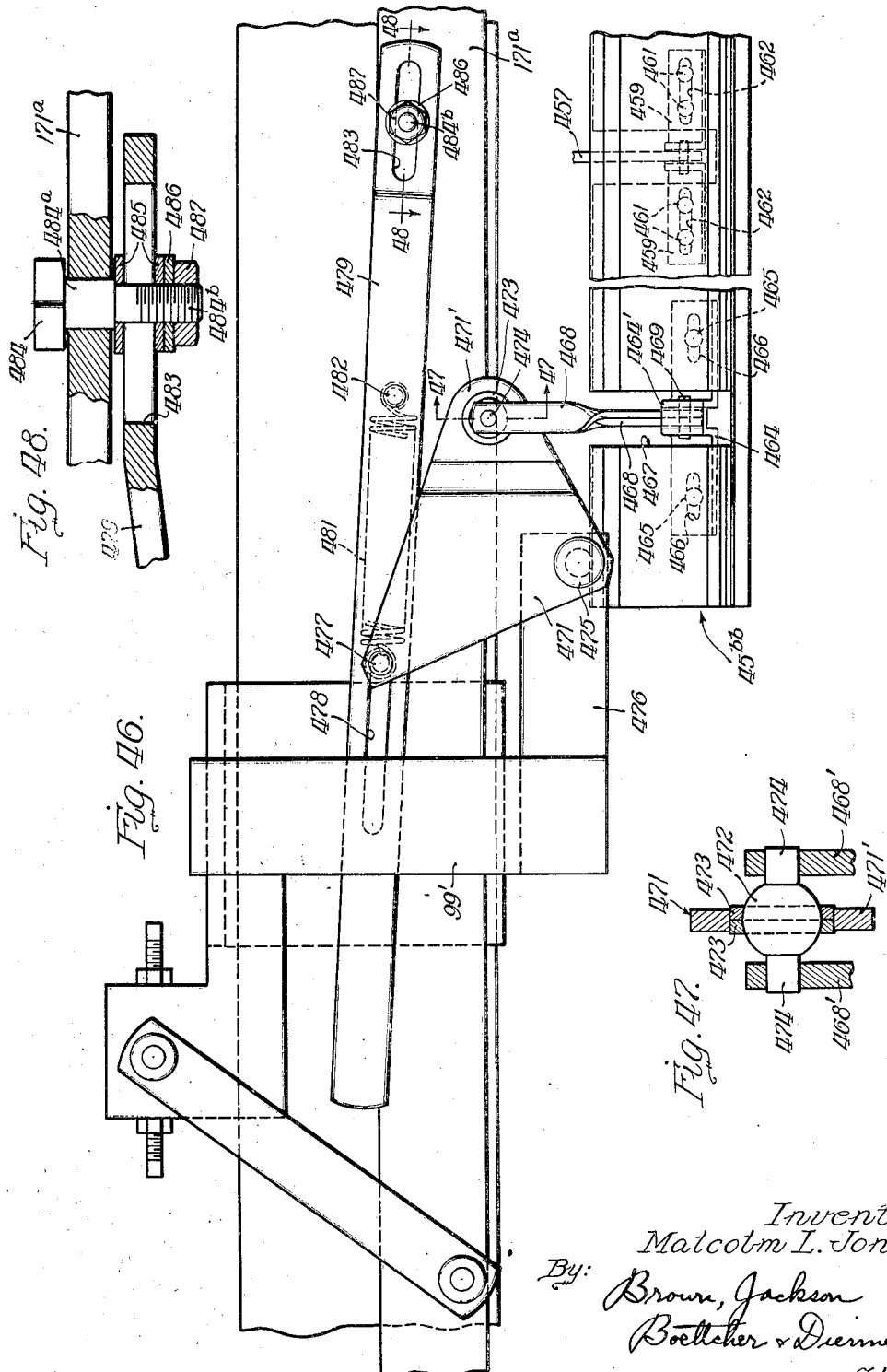

Patented Mar. 21, 1939

2,151,033

UNITED STATES PATENT OFFICE 2,151,033

FOLDING PARTITION

Malcolm L. Jones, Aurora, Ill., assignor to Richards-Wilcox Manufacturing Company, Aurora, Ill., a corporation of Illinois Application July 14, 1934, Serial No. 735,153

63 Claims. (Cl. 20—20)

The present invention relates to folding partitions.

The general object of the invention is to provide an improved construction which is adaptable to the requirements of extremely large size installations, although the invention is not necessarily limited thereto. Partitions constructed in accordance with the present invention may be utilized for subdividing a school gymnasium, a conventional hall, an assembly hall, a church or other enclosure of corresponding size. As illustrative of the sizes necessary for some of these installations, it may be required that the partition extend from twenty to thirty feet in height and be capable of spanning an opening ranging anywhere from twenty-five to one hundred feet in width. In these constructions a single panel of the partition may weigh several hundred pounds. Obviously, in constructions built on this scale, conditions and working requirements are immediately encountered which are not present in the relatively small manually manipulated partitions, which are extended to closed position by an individual merely pulling outwardly on the outermost panel and which are folded back into open position by merely pushing inwardly on the panels. In the large size embodiments of my invention it is preferable that substantially all operations incident to closing and opening the partition be performed by power means, such as an electric motor. However, the invention is not limited to power operation, because even the large size partitions of my invention can be manually operated, except that instead of a direct manual grasping and manipulation of the panels, the manual effort is transmitted through a crank or like operating element to driving mechanism which actuates the partition.

In developing a partition which will give satisfactory performance and which will meet the more exacting requirements arising in installations such as I have mentioned, numerous features have been devised, some of which have particular utility in these large size partitions, and others of which have general utility in all types and sizes of folding partitions, including the smaller partitions which are actuated by direct manual manipulation of the partition panels. Accordingly, the invention in its broader aspects is not limited to large size partitions constructed for motor or hand crank operation, but also comprehends smaller partitions adapted for direct manual operation.

One of the principal objects of the invention is to provide a folding partition in which the partition panels are brought downwardly against the floor when the partition is extended into its closed position. That is to say, the panels are held in an elevated position, spaced considerably from the floor, during the time that the partition is moving between its open and closed positions and when it is in its completely folded position, but after the panels have been extended out into their closed position they are moved down from their elevated positions and brought into direct contact against the floor. In the preferred embodiment, the panels are resiliently pressed against the floor under spring pressure. Numerous advantages are obtained by this feature of moving the panels down against the floor. For example, the partition can thereby be made practically sound-proof, since the direct contact of the panels with the floor or with the bottom guide track serves to close the bottom space between the panels and floor, which has been prevalent in practically all prior folding partitions, and which always transmitted a considerable amount of sound from one side of the partition to the other. Obviously, this sound-proofing characteristic is a very desirable asset in the case of partitions dividing assembly halls and the like, where different discussions or programs may be taking place on opposite sides of the partition. Also, by resiliently forcing the partition panels down against the floor under a relatively heavy spring pressure, a very effective frictional locking engagement may be established between the lower edges of the partition panels and the floor. This is of advantage for preventing the possibility of lateral or twisting displacement of the extended panels, which might arise from wind pressure acting against the partition, or from gymnasium players colliding with the partition in gymnasium installations. The complete closing of any space between the panels and the floor further avoids draughts under the partition. Moreover, by reason of the fact that the final closing of the partition involves a definite downward movement of the panels, it follows that when the panels are elevated they may be spaced an appreciable distance from the floor. This avoids all frictional contact with the floor during the movement of the partition. It also prevents any likelihood of the partition becoming jammed or bound because of variations in the floor level, or because of sagging of the overhead supporting track or its supporting truss. Furthermore, it facilitates installation by permitting a greater tolerance of the spacing between the upper and lower guideways.

In this regard, another object of the invention is to provide improved means which will secure a cushioning, yieldable joint between the bottom edges of the partition panels and the floor or floor track. In the preferred manner of obtaining this joint, strips of sponge rubber or like material are secured along the lower edge of each panel, the arrangement being such that this rubber is tightly compressed against the floor or floor track when the partition is lowered, thereby establishing a sound-proof and friction lock seal. In this connection, it is another object of the invention to provide an improved floor guideway or floor track. The track groove is completely filled by a strip of sponge rubber or like material, which can be compressed down into the groove by each guide roller traveling along the groove, but which immediately expands back to fill the groove to the level of the floor after the roller has passed. Such construction prevents the possibility of dirt and foreign articles collecting in the groove and obstructing the motion of the guide rollers along the groove. Furthermore, this strip of sponge rubber in the track abuts against the sponge rubber strips on the bottom edges of the panels, and cooperates therewith in producing the sound-proof, friction lock joint. Another feature of this floor track is that it embodies metallic reenforcing or protecting means which prevents the possibility of the swelling or contraction of the wood floor from varying the width of the track groove. In connection with soundproofing the partition, I also contemplate providing sponge rubber strips between the abutting vertical edges of the panels, and in association with the jamb members at the opposite sides of the partition opening.

Another object of the invention is to provide an improved construction of propelling mechanism for propelling the panels from folded position to extended position and back to folded position. This mechanism, in its preferred embodiment, comprises a chain loop extending along the overhead guideway or track, and arranged to have operative connection with the leading or outermost panel of the series. The partition is extended to closed position by propelling this chain loop in one direction to pull said outermost panel outwardly along the guideways, and the partition is folded back into its open position by propelling this chain loop in the opposite direction to push this outermost panel inwardly back into the folding zone, the other panels following the motion given this outermost panel.

Another object of the invention is to provide an improved construction of lowering mechanism for effecting or controlling the raising and lowering movements of the panels relatively to the floor. This mechanism, in its preferred embodiment, comprises one or more lowering bars disposed adjacent to the overhead track and extending substantially the entire width of the partition opening. When the partition is in its extended position, these lowering bars are effective to impart downward movement to all of the partition panels, substantially simultaneously.

Another object of the invention is to provide improved mechanism which will insure the proper timed relation between the successive steps, in the closing operation, of first extending the panels to their closed positions, then lowering the panels into engagement with the floor; and, conversely, in the opening operation, of first raising the panels to their elevated positions, and then moving the panels inwardly to their folded positions. In its preferred embodiment, this mechanism comprises an arrangement of parts which is operative during the closing operation to establish a driving relation between the chain loop and the outermost panel for extending the panels, and is thereafter operative to transfer this driving relation from the chain loop to the lowering mechanism for lowering the panels. In the opening operation, after the chain loop has transmitted power to the lowering mechanism for causing the panels to rise, the driving relation is transferred from the chain loop to the outermost panel for moving the panels back to folded position.

Another object is to provide improved means for raising the panels to their elevated positions. Such raising means is preferably in the form of lifting springs, embodied directly within certain of the panels and reacting against certain of the roller carriages traveling along one of the guideways. These springs exert an upward pressure on the panels which is normally operative to hold the panels elevated. The lowering mechanism exerts a downward pressure on the panels which is sufficient to overcome these lifting springs and thereby force the panels down against the floor. In this regard, another feature of the invention is the provision of snubbing or cushioning springs coacting with the lowering mechanism, arranged whereby said cushioning springs yield as the pressure of the panels against the floor is increased, so that the contact between the panels and the floor is maintained under resilient spring pressure. This maintains a tight seal and also accommodates variations in the floor level, track level, etc.

In its preferred construction, my improved partition is of the type wherein the panels are centrally swiveled, i. e., each guided panel swivels around a vertical axis which is disposed substantially midway between the vertical edges of that panel, so that the partition folds in accordion fashion. However, I wish it to be understood that the invention is not limited thereto but also comprehends other constructions, such as those wherein the swiveling axes are adjacent to the edges of the panels. The construction employing centrally swiveled panels is preferably in large size partitions because the weight of each panel is balanced to each side of the swiveling axis, which minimizes the stresses to be borne by the roller carriages and guide tracks, particularly during the folding and unfolding operations. In constructions having the swiveling axes adjacent to the edges of the panels, the movement of the panels into folded position results in the overhanging weight of the panels exerting lateral stresses on the roller carriages, pintles and guide tracks, which may be objectionable in large size, heavy partitions.

In such constructions of my partition as may employ centrally swiveled panels, it is a further object of my invention to dispense with the half-panel or half-door which is usually provided in these centrally swiveled constructions to connect the partition to the adjacent jamb at the folding side of the partition opening. These half-panels detract considerably from the appearance of the partition when extended, and are otherwise objectionable. In my improved construction, the innermost panel of the series is of the same width as the other panels, and is free from the folding jamb in the sense that it can have translational as well as swinging movement relatively to said jamb. This feature enables the entire partition, including innermost panel, to be moved back into an enclosing pocket in the folding operation, in such installations as may employ a pocket for receiving the folded partition.

Another object of the invention is to provide improved folding means for automatically deflecting the innermost panel toward or into its folded relation, during the operation of moving the partition back into its folded, open position. In its preferred embodiment, this automatic folding mechanism also performs the additional function of deflecting said innermost panel back into straightened relation, or approximately straightened relation, with respect to the guideways, during the operation of extending the partition out to its closed position.

Another object of the invention is to provide improved straightening means for automatically straightening or deflecting the other panels into positions in approximate alignment with the guideways as the panels are extended out toward the closed position of the partition. In one preferred embodiment, this means includes a spring-pressed arm which exerts lateral pressure against the panels for deflecting them toward or into positions of alignment between the two spaced confining rails which are usually associated with the upper guideway, these rails serving to prevent lateral swiveling of the panels in the closed position of the partition.

Another object of the invention is to provide an improved construction of folding jamb at the folding side of the partition opening. This jamb includes a movable jamb plate which is moved into engagement with the innermost panel when the partition is extended to closed position, and which is moved out of engagement with said innermost panel when the partition is to be moved to folded position. The latter operation permits sidewise swinging motion of the inner edge of the innermost panel in the partition folding operation.

Another object of the invention is to provide a construction in which each of the above described operations is performed automatically, so that the operation is fool-proof and not in any way dependent upon the skill of the individual performing the control operations. This automatic characteristic is existent substantially to the same extent in the manually operated embodiment as it is in the electrically operated embodiment, since the rotation of the hand crank in the former embodiment is the only operation to be performed by the individual. In both embodiments, all control operations involving propelling the panels inwardly or outwardly, raising or lowering the lowering bars to raise or lower the panels, deflecting the panels into folded or extended relation, and opening and closing the foldable jamb, are performed automatically in proper sequence and timing. In this regard, the automatic folding of the innermost panel toward folded position, and the automatic straightening of the innermost and adjoining panels into aligned relation, represent a decided improvement over prior power driven partitions, which have usually required that the operator manually deflect or break the innermost panels in the folding operation and also straighten these innermost panels in the partition closing operation. This requires a certain degree of skill by the operator, and is frequently accompanied by the hazard of his fingers becoming caught between the edges of adjoining panels.

In constructions utilizing a pocket at one side wall for receiving the folded partition, it is another object of the invention to provide automatically operating doors for this pocket which will automatically open and automatically close in the different operations of the partition.

Another object of the invention is to provide an improved construction of overhead track along which travel the upper roller carriages. This track embodies an improved relation of bars which reenforce the track and provide track surfaces which reduce friction and result in proper alignment of the rollers thereon.

Other objects and advantages of the invention pertaining to the manner of operating the limit switches for the electric motor, to different structural features and control devices and to other related features, will appear from the following detail description of a preferred embodiment of my invention.

In the accompanying drawings illustrating such embodiment:

Figure 1 is a cross-sectional view through a typical enclosure, such as a gymnasium, illustrating the partition in its extended position to divide this enclosure, the construction shown being of the form wherein the partition folds back into a pocket or well at one side of the enclosure;

Figure 2 is a fragmentary horizontal sectional view taken on a plane through the confining rails extending along the lower side of the upper guideway.

Figure 3 is a view similar to Figure 2, but illustrating a modified arrangement wherein there is no pocket for receiving the folded panels, but instead the group of panels project out from the adjacent side wall;

Figure 4 is a side elevational view of the driving mechanism which operates the partition;

Figure 5 is a plan view thereof;

Figure 6 is a detail view showing one of the limit switch operating arrangements for controlling the driving mechanism;

Figure 7 is a horizontal sectional view through the meeting edges of two adjoining panels;

Figure 8 is a fragmentary vertical sectional view transversely through the upper and lower guideways;

Figure 9 is a fragmentary bottom view of the overhead track on a smaller scale, illustrating the locking relation at the joints between track sections;

Figure 10 is a transverse sectional view through one of the lower pintles and roller carriages associated with each of the guided panels;

Figure 11 is a view at right angles thereto, taken approximately on the plane of the line 11—11 of Figure 10;

Figure 12 is a longitudinal vertical sectional view illustrating one of the upper pintles and roller carriages associated with each of the guided panels;

Figure 13 is a transverse sectional view taken on the plane of the line 13—13 of Figure 12;

Figure 14 is a horizontal sectional view taken on the plane of the line 14—14 of Figure 12;

Figure 15 is a bottom view of the nut retaining clip illustrated in Figure 12;

Figure 16 is a horizontal sectional view taken on the plane of the line 16—16 of Figure 12;

Figure 17 is a side elevational view illustrating the arrangement of the track brackets for supporting the overhead track, and the arrangement of the supporting links which carry the lowering bars;

Figure 19 is a longitudinal sectional view through the lowering machine;

Figure 20 is a transverse sectional view taken on the plane of the line 20—20 of Figure 19;

Figure 21 is a plan view of the lowering machine;

Figure 22 is a fragmentary sectional view showing the carriage of the lowering machine in the other extreme position, corresponding to the lowered positions of the lowering bars;

Figures 23 and 24 are fragmentary plan and side elevational views respectively, showing the clutch dogs on the roller carriage of the outermost panel;

Figures 25 and 26 are fragmentary plan and side elevational views respectively showing the power transmitter which transmits power alternatively to these clutch dogs of the outermost panel and to the lowering machine;

Figure 29 is a fragmentary plan view on a larger scale showing the connection of this mechanism with the innermost panel;

Figure 31 is a transverse sectional view through the upper guideway, showing how this guide track and roller carriage are arranged therein;

Figure 32 is a side elevational view of the automatic straightening mechanism which deflects the panel into straightened relation as the partition is being closed;

Figure 33 is a plan view showing the relation of this automatic straightening mechanism with respect to the folding zone and the confining rails of the overhead guideway;

Figure 34 is a plan view of the automatic folding jamb adapted for installations of the type shown in Figure 3;

Figure 35 is a detail view showing the manner of operating this folding jamb from one of the lowering bars;

Figure 36 is a fragmentary elevational view illustrating the manually operated driving apparatus for actuating the partition;

Figure 37 is a sectional view taken on the plane of the line 37—37 of Figure 36;

Figure 38 is a diagrammatic plan view showing an arrangement for exerting an inward pulling force on the innermost panel of the series;

Figure 39 is a similar view showing improved mechanism for exerting a straightening force on those panels which normally lie within the folding zone when the partition is straightened;

Figure 40 is a transverse sectional view, taken approximately on the plane of the line 40—40 of Figure 41, showing a modified construction incorporating improved mechanism for folding and straightening the innermost panel of the series, and incorporating improved automatic mechanism for opening and closing the doors which are provided at the front end of the pocket receiving the folded panels;

Figure 41 is a fragmentary plan or horizontal sectional view showing this modified construction;

Figure 42 is a detail horizontal section of the same, taken approximately on the plane of the line 42—42 of Figure 43;

Figure 43 is a vertical sectional view taken approximately on the plane of the line 43—43 of Figure 42;

Figure 44 is a fragmentary side elevational view showing a construction employing folding confining rails in the folding zone;

Figure 45 is a transverse sectional view thereof, one side of this figure being taken on one plane and the other side on another plane;

Figure 18:
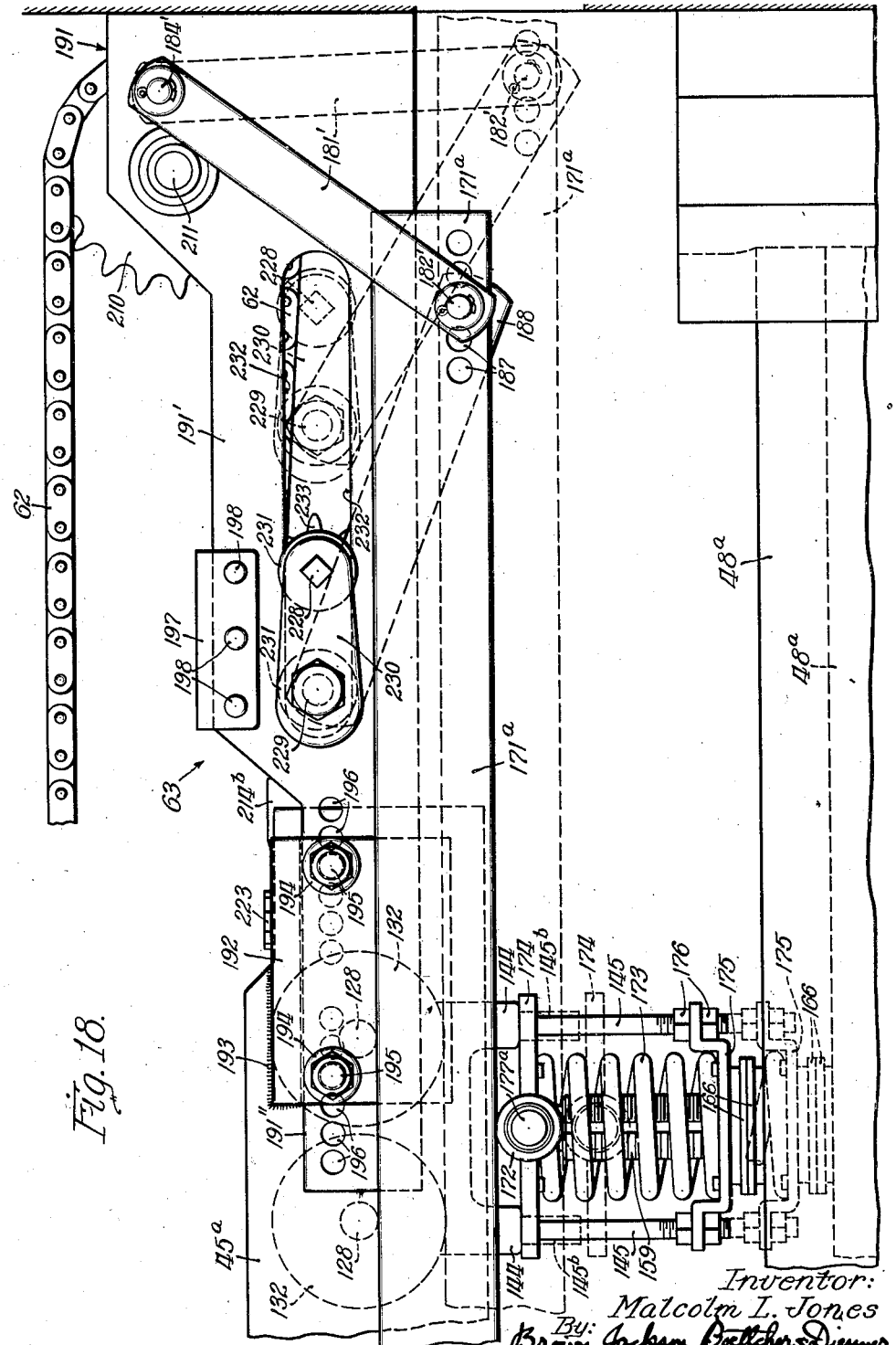
Figure 18 is a side elevational view of the lowering machine for oscillating the lowering bars upwardly and downwardly.

Figure 46 is a fragmentary side view showing one of the mechanisms for operating one of the folding confining rails; and Figures 47 and 48 are detail sectional views of this mechanism, taken on the planes of the lines 47—47 and 48—48, respectively, of Figure 46.

I shall first briefly designate the main operating parts to show their general location and arrangement and shall then describe the different structures in detail. Referring first to Figures 1 and 2, the opening which is to be closed by the partition is generally designated 40, and is defined between the two side walls 41 and 42 and between the overhead truss or like supporting structure 43 and the floor 44. Extending along the overhead truss, preferably below the same, is the overhead guideway structure, generally designated 45. Extending across the floor within the partition opening is a lower guideway or floor track 46. In the arrangement illustrated the panels are adapted to be folded together adjacent to the left or near side wall 41, and when extended they reach to the right or far side wall 42. The panels are designated 48a, 48b and 48, 48'. The leading panel which leads the extension movement of the partition to closed position is designated 48a, and may be aptly referred to as the outermost panel. The trailing panel which trails in this extension movement is designated 48b, and may aptly be referred to as the innermost panel. The intermediate panels 48 and 48' are differentiated by whether or not they are guided panels having direct guided engagement with the upper and lower guideways. That is to say, the outermost panel 48a, the innermost panel 48b, and all alternate panels between these two, have guide rollers or roller carriages associated therewith for traveling along the upper and lower guideways 45, 46. The other panels 48' alternating therebetween do not have such direct guided relation. However, all of the panels are hinged together at their adjoining edges by hinges 49 (Figures 7 and 33) so that the latter panels are indirectly guided by the other panels.

As previously mentioned, in the preferred construction each of the guided panels 48, 48a, 48b is arranged to swivel around an individual vertical axis which is located substantially midway between the side edges of that panel. These swiveling axes are diagrammatically represented by the upper and lower pintles 51 and 52 illustrated in dotted lines in Figure 1. Each upper pintle 51 is connected with an upper roller carriage 53 traveling in the upper guideway and each lower pintle 52 is connected with a lower guide roller or roller carriage 54 traveling on the lower guideway. The guided panels swivel around these pintle axes in being folded and unfolded, and are always in balanced relation with respect to said axes.

The actual swiveling of the panels into folded and unfolded relation occurs in a folding zone adjacent to the left hand side of the partition opening 40, the approximate location of this folding zone being designated Z in Figure 2. From this folding zone to the righthand side of the partition opening, the overhead guideway 45 includes two laterally spaced confining rails 45b, 45c (Figure 8) which embrace the upper edges of the extended panels lying in this portion of the guideway and prevent any swiveling or sidewise movement thereof. Referring to Figure 2, it will be observed that located in or adjacent to this folding zone are: (1) the automatic folding mechanism 56 which operates to deflect the innermost panel 48b laterally toward its folded position and back toward its straightened position; and (2) the automatic straightening mechanism 57 which operates on the other panels to deflect them toward straightened alignment as the panels move outwardly toward the extended closed position of the partition. In the preferred arrangement, the driving mechanism 58 is also located adjacent to this folding zone, although this driving mechanism might be otherwise disposed if desired. Said driving mechanism comprises a rotatable driving member 59 (Figure 5) in the form of a drive shaft to which rotation may be transmitted from an electric motor 61 or from a hand crank, as will be later described. A chain 62 (Figure 5) driven from this driving member extends in a loop across the width of the partition opening, adjacent to or enclosed within the casing which encloses the upper guideway. As previously remarked, this chain serves to transmit power alternatively to the outermost panel 48a and to the lowering mechanism. The lowering mechanism comprises a lowering machine 63 which is preferably mounted adjacent to the outer end of the overhead guideway 45 (Figure 1). This lowering machine oscillates the two lowering bars which will be later described.

In some installations the panels may be arranged to fold into a pocket or well 65, as shown in Figures 1 and 2, which pocket is sufficiently deep to receive all of the panels so that the partition is out of sight when folded. This pocket may consist of a recess formed in the adjacent side wall 41; or in installations in gymnasiums or the like having a side balcony or balconies for spectators' seats, the pocket may consist of spaced side walls interposed between sections of the balcony and extending from the outer edge of the balcony back to the side wall 41 and reaching from the floor to the overhead truss or ceiling. The entrance of the pocket can be closed by folding doors 65a and 65b. Figure 3 illustrates the more conventional type of installation wherein the folded panels are not enclosed but project out from the adjacent side wall 41. In this type of installation I provide the aforementioned folding jamb, designated 66, comprising a folding jamb rail which can swing away from the innermost panel 48b to permit sidewise folding movement of the latter.

Referring now in detail to the construction and operation of the different parts, the panels may be of solid or hollow construction, built up of solid wood, plywood, celotex and the like; and for gymnasium installations the panels may be covered with a suitable fabric, such as duck. One of the panels may be provided with a wicket door 48w to afford access from one side of the extended partition to the other. The hinges 49 (Figures 7 and 33) connecting edges of adjoining panels may be of the concealed type or of the butt type. A sound-proof seal may be established between the abutting edges of the panels by the use of yieldable strips 68c of sponge rubber or like material extending from the top to the bottom of the panel edges. These abutting edges have beveled tongue and groove joints 68a, 68b, and the rubber strip 68c is preferably cemented in a recess in the base of the beveled groove 68b, whereby the rubber is compressed by the tongue 68a when the panels are swung into contiguous alignment.

By reason of the relatively large number of panels which can be handled in a motor operated partition of the present type, a single assembly is operative to span a relatively wide space, but, if desired, two separate assemblies may be provided for extremely wide openings 40, with the two assemblies folding outwardly from opposite side walls 41 and 42, and with the leading panels 48a of both assemblies engaging substantially in the center of the opening.

Referring now to the lower guideway or floor track 46, it will be seen from Figures 8, 10 and 11 that this track comprises a steel or iron channel 71 extending the entire width of the opening 40. Hardwood strips 72 are secured in this channel, provided with lateral edge portions overlying the top edges of the channel flanges. Screws 73 are extended down through these wood strips and through holes in the channel 71 for screwing into the sleeper 74 below the floor, the heads of these screws being preferably recessed so that they present no metallic surfaces at the floor level. Metallic strips 46a, preferably of bronze, are fixedly secured to the inner edges of the two wood strips 72. A strip of sponge rubber 75 or like yieldable material is inserted in the space between the metallic strips 46a. As previously remarked, the lower guide rollers 54 associated with each guided panel roll along this floor track, and, as shown in Figures 10 and 11, each of these guide rollers comprises a main hub or barrel portion 54a and a central annular guide flange 54b having a beveled edge. The hub portion 54a has bearing engagement on the upper edges of the metallic strips 46a and on the adjacent portions of the wood strips 72, and the annular flange 54b travels between the metallic strips 46a, compressing the sponge rubber strip, as shown in Figure 11, as it travels in the groove between said metallic strips. The sponge rubber strip 75 may be cemented to the bottom of this groove, but is preferably not cemented to the side plates 46a, in order that it shall be free to be pressed downwardly by the guide flange 54b of the roller as the latter travels along the track. It will be noted that the wood strips 72 and metalic strips 46a are flush with the top surface of the floor 44 so that there is no projection from the floor. Also, after each guide roller passes along the track, the sponge rubber strip 75 immediately expands back to the top level of the track and thereby eliminates any depression in the floor and prevents the possibility of dirt and other foreign matter collecting in the track. The base channel 71 provides a rigid reenforcing structure for the track so that irrespective of any expansion or contraction of the floor 44, the width of the groove between the metallic strips 46a will not be varied.

Referring to the swiveling pintle connection established between each guide roller 54 and its associated panel, it will be noted that the roller is mounted between the side arms of a roller carriage in the form of a yoke 76 which has a pivot pin 77 fastened transversely through the lower ends of its arms. Ball bearings are preferably interposed between this pivot pin 77 and the inner periphery of the roller hub portion 54a. The yoke is secured to the lower end of the pintle 52 over which a sleeve 78 is mounted for swiveling rotation and reciprocation. The sleeve is recessed within the panel. A compression spring 79 is confined between the upper end of said pintle 52 and a suitable stop projection in the upper end of the sleeve 78, such as the cross pin 81. The lower end of the sleeve threads into a mounting plate 82 which is secured by screws 82a to the top wall of the cavity 83 within which the guide roller is positioned. The sleeve 78 is free to rotate around the pintle 52 in the folding and unfolding movements of the panel, and is free to move vertically along said pintle or plunger in the raising and lowering movements of the panel, the spring 79, at this time, maintaining the roller 54 in continuous guiding engagement with the track 46.

Extending along the bottom edge of each panel is a sealing and sound deadening strip 85, also preferably composed of sponge rubber. These strips are continuous from edge to edge of each panel, except at the cavities 83 of the guided panels, in which are disposed the guide rollers 54. The rubber is cemented to a mounting strip 86 having dove-tail sides for fitting within a dove-tail groove 87 along the bottom edge of the panel, such mounting enabling the mounting strips and their rubber strips to be readily removed and substituted in the event of wear of the rubber. The rubber extends up into a longitudinal groove having outwardly flaring side walls 88, and when the partition is lowered to its sealing position (as indicated in dotted lines in Figure 8 and in full lines in Figures 10 and 11), the rubber is compressed and expanded laterally against these sloping walls so as to increase its area of sealing contact with the floor and with the panel. When the partition is in its raised position, as indicated in full lines in Figure 8 (and in dotted lines in Figures 10 and 11) for the folding or unfolding operations, this rubber strip is raised entirely clear of the floor so that it offers no frictional hinderance to movement of the partition. The springs 79 retain the guide rollers 54 in engagement with the floor track during all raising, lowering and swiveling movements of the panels. In the preferred construction for most installations, it is desirable to provide the floor track 46, and to provide each guided panel with one of these lower guide rollers 54 coacting with said track. This, however, is not essential, since the guiding function can be effected solely by the roller carriages 53 rolling within the overhead guideway 45. Such alternative construction, wherein the floor track and lower guide rollers are eliminated, is made feasible by the fact that when the partition is lowered into contact with the floor, the firm clamping pressure exerted by the rubber strips 85 against the floor is adequate to secure the lower ends of the panel sections against any sidewise movement relatively to the floor.

A sound-proof seal may also be established between the outermost panel 48a and the far wall 42. As shown in Figure 34, a jamb structure 89 which is secured to this wall, comprises spaced vertical rails 91 between which a strip 92 of sponge rubber or like material is secured. In the partition closing operation, the leading edge of the outermost panel 48a enters between the rails 91 and compresses the rubber strip 92. It will be seen from the foregoing that a sound-proof seal is established between the abutting edges of the panels by the strips 68c; between the panels and the floor by the strips 75 and 85; and between the partition and the jamb 89 by the strip 92. The sealing arrangement at the folding jamb will be later described.

Referring now to the construction of the overhead guideway 45, and to one improved manner of mounting the same, it will be seen from Figure 8 that this guideway comprises an overhead track 45a and the two aforementioned confining rails 45b, 45c. The upper roller carriages 53 travel in the track 45a and the two confining rails 45b, 45c embrace the upper edges of the panels when the latter are in either their raised or lowered positions. The track 45a is preferably enclosed by a casing built up of side plates 94a, 94b and bottom strips or rails 95a, 95b. The two confining rails 45b, 45c are secured to the under sides of these bottom casing strips 95a, 95b. These various parts making up the overhead guideway are anchored at spaced intervals to the under side of the truss or like supporting structure 43. This truss usually comprises structural bars having laterally extending base flanges 43′, and in suspending the overhead guideway therefrom bolts 97 are arranged at spaced intervals to pass down through said flanges for securing U-shaped supporting brackets 98 to the under side of the truss. Secured to each of these brackets 98 is an outer depending bracket 99 and an inner depending bracket 101, the outer brackets serving to support the casing side plates 94a, 94b and bottom rails 95a, 95b and the inner brackets serving to support the track 45a. These three brackets 98, 99 and 101 are preferably welded together as indicated at 102, although they may be secured together in any other desired manner. Figure 17 illustrates how these bracket assemblies are suspended at spaced intervals along the truss 43. In the folding zone adjacent to the lefthand end of the track, the bracket assemblies may be spaced relatively close together, because in this zone the weight of all of the panel sections will be concentrated on a relatively short length of the track when the sections are folded together; along the remainder of the track a wider spacing may prevail between the bracket assemblies. The track 45a usually consists of several sections, arranged in end to end abutment. One of these bracket assemblies 98—101 is preferably provided at each joint between contiguous track sections 45a. In the case of each bracket assembly disposed at a track joint, an inverted U-shaped joint clamp 104 is associated with the bracket assembly for locking the two track sections together against endwise spreading at the joint. As shown in Figures 8 and 17, each joint clamp has its horizontal portion lying in the central depressed portion of the upper bracket 98, and its downwardly extending end legs are provided with locking tongues 104a which extend down into transverse slots punched in the tops of the track sections. A screw or bolt 105 extends up through matching longitudinal slots in the brackets 98, 99 and 101, and threads into a tapped hole in the intermediate portion of the joint clamp for securing the same in place. It will be evident that the engagement of the vertical tongues 104a in the transverse slots in the track sections will prevent relative longitudinal separating movement between the track sections.

The track is of channel-shaped cross-section, having the lower margins of its side flanges sloped inwardly and downwardly and then bent on a curve to provide the trough-shaped lower flange portions 106. Welded in each of these trough-shaped flange portions is a round bar 107, which serves as the track surface proper. As shown in Figure 9, the inwardly curved flanges 106 have semi-circular holes 108 punched out therein at spaced intervals to facilitate the operation of welding the round bars 107 to these flanges, the weld metal substantially filling these holes and joining with the flange and with the round bar. As shown in said latter figure, the ends of said round bars project from the ends of the track sections in alternating relation, so that when two track sections are joined together these bars will overlap from one section to the other for reenforcing the joint. Matching recesses 109 in the ends of the track sections establish a hole affording access to the head of the screw 105 which secures the joint clamp to the bracket assembly. As an alternative construction, the upper bracket 98 may be eliminated, in which case the bolts 97 are then made sufficiently long to extend down through appropriate apertures in the transverse web portion of the bracket 99, and are arranged to have nuts screw over said bolts above and below said web portion. Adjustment of these nuts upwardly and downwardly along said bolts would then provide for adjusting the height of the bracket assembly and track 45a relatively to the truss 43.

The casing side plates 94a, 94b enclosing the bracket assemblies and track may be secured to the bracket assemblies by screws 114 threading into the outer bracket 99. Molding strips 115 may be secured along the upper edges of these side plates to trim the casing. The bottom casing strips 95a, 95b are secured to successive bracket assemblies by screws 117 passing down through the inwardly extending lower legs 99a of the outer trim brackets 99 and screwing into threaded sleeves 118 secured in the strips 95a, 95b. The confining or stop rails 45b, 45c are secured to the bottom strips 95a, 95b by screws 112 which thread into the sleeves 118. These stop rails extend across the width of the doorway up to the folding zone Z, where they terminate to permit the sidewise swiveling movement of the panel sections in the folding operation. As previously remarked, the extended panel sections have their upper edges confined in the guideway space between these rails when the panels are raised and when they are lowered. The inner surfaces of these confining rails may be faced with metal plates 124.

Referring now to the upper wheeled carriages 53 which travel within the track 45a, each of these carriages is in vertical alignment with an upper pintle 51 in each guided panel 48a, 48, 48b, as best shown in Figure 12. In the preferred embodiment of my invention, the major portion of the weight of the panels is carried by these overhead carriages 53, in which embodiment these carriages thus function as guiding devices and also as hanger devices in association with other parts of a hanger assembly including the upper pintle 51. As an alternative construction, however, the major portion of the weight of the panels might be carried by the lower guide rollers 54, in which case the overhead carriages 53 might then function wholly or mainly as guiding devices. Referring to the preferred embodiment first mentioned, each of the carriages comprises a frame casting 126 of approximately rectangular outline (Figure 12) having transversely extending circular cored openings 127 adjacent to its ends for receiving the transverse axles 128 and the ball bearings 129 in which these axles are mounted (see Figure 13). Mounted on opposite ends of each axle are bushings 131 on which the wheels 132 are mounted. The axles are rotatable in said ball bearings, and the wheels 132 are rotatable relatively to said axles, thereby providing a double journal construction between the wheels and the frame 126. The wheels are arranged in two pairs on opposite sides of the frame casting 126, and have grooved peripheries for riding on the upper surfaces of the round track bars 107. In the preferred construction, the radius of curvature of the peripheral groove in each wheel 132 is larger than the radius of curvature of the round bar 107 (Figures 8 and 13), whereby the rolling contact of the wheel along each bar is substantially a point or line contact. The wheels are capable of inward and outward shifting movement on the axles 128 or bushings 131 so as to accommodate any slight variations in the lateral spacing between the round bars 107. Secured to the opposite ends of each frame casting 126 are bumper blocks 137, of wood or other like material, and secured to the top of the casting is a channel-shaped chain guide 138 which serves to guide the lower run of the driving chain 62. All of the wheeled hanger devices 53 are the same for all of the panels, with the exception of the leading hanger device 53a associated with the leading panel 48a, which hanger carriage is constructed to provide for the mounting of gripping pawls and guiding devices, to be later described. Such portion of the weight of the partition as is suspended from each carriage 53 is transmitted through the upper pintle 51 which also serves as a pendant rod. The upper end of this pintle rod has a flat, tongue-shaped portion 141 which extends into a correspondingly shaped socket cored out in the lower portion of the frame casting 126, and is secured therein by a transverse rivet or bolt 143. This pendant rod extends down through the open slot in the bottom of the track 45a. The casting 126 is also formed with two end bosses 144 extending down through said slot for receiving the upper ends of guide posts or studs 145, which will be later described.

As best shown in Figure 12, the pintle or hanger rod 51 extends down into a relatively long hole 146 provided in the upper portion of each guided panel 48, and a bearing arrangement is established between this rod and the panel so that the panel can swivel about the rod. Operatively connected between said rod and the panel is a spring 147, also confined within this hole. In the preferred construction, the spring is so connected between the pendant rod and panel that the weight of the partition stretches the spring in tension, although this arrangement might be reversed, if desired, so that the weight of the partition would contract the spring in compression. In the tension embodiment illustrated, the upper convolutions of the spring are secured to an upper bushing or spring anchorage 148 by screwing over a helical groove 148' formed in said bushing, and the lower convolutions of the spring are secured to a lower bushing or spring anchorage 149, also by screwing over a helical groove 149' in this bushing. The upper bushing 148 is operatively connected to pull downwardly on the hanger rod 51 through a transverse pin 151, and the lower bushing 149 is arranged to thrust upwardly on the panel through a sleeve 152. The sleeve 152 encircles the rod 51 and has guided engagement with a guide collar 153 secured to the lower end of said rod. The lower end of the sleeve abuts against the bottom of a bore in the lower bushing 149. The upward pull exerted by the tensile force of the spring is transmitted through said lower bushing 149 against the lower abutting end of the sleeve 152 to transmit an upward force through said sleeve to the panel. The transverse pin 151 passes through the upper bushing 148, through the sleeve 152 and through the hanger rod 51, as shown in Figure 16. The sleeve 152 is provided with diametrically opposite longitudinal slots 155 through which the pin 151 passes. These slots permit rising and lowering movement of the sleeve 152 relatively to the rod 51. The load bearing connection between the upper end of the sleeve 152 and the panel comprises an anti-friction thrust bearing including a lower race 156, an upper race 157, and a series of balls 158 disposed between said races. The upper end of the sleeve 152 abuts against the end of a counterbore formed in the bottom of the lower race 156. A similar counterbore in the upper end of the upper race 157 abuts against the lower end of an externally threaded adjusting sleeve 159. Said sleeve has threaded engagement within a nut 161 which abuts against the bottom of a panel supporting plate 162. Such plate extends lengthwise of the top of the guided panel, and comprises end portions 162a which are rigidly secured to the panel by bolts or screws 160 (Fig. 29) passing down through said end portions and into the panel. The intermediate portion of said supporting plate is depressed, as indicated at 162b, to accommodate a strengthening plate 162c which is welded to said depressed portion so as to constitute in effect a part of the plate 162. The threaded adjusting sleeve 159 passes freely through a hole 163 extending through the two plate portions 162b and 162c. The threaded sleeve is adapted to be screwed upwardly or downwardly through the threads of the nut 161 for adjusting the tension of the spring 147, and in such adjustment the nut 161 must be held against rotation. This is accomplished by providing a nut holding clip 165 (Figure 15) which is of channel-shape and has a polygonal opening 165a in the web portion thereof for engaging the faces of the nut 161 to hold the latter against rotation. Prior to the attachment of the supporting plate 162 to the top of the panel, the clip 165 is assembled over the under side of said supporting plate, with the side flanges of the clip extending upwardly to embrace the side edges of the depressed plate portion 162b. Thus the clip is fixedly anchored to the supporting plate 162, for securely holding the nut 161 against rotation as the sleeve 159 is screwed upwardly or downwardly through the nut. This operation of adjusting the sleeve is performed by the rotation of nuts or polygonally-shaped turning devices 166 which fit over the sleeve above the top of the partition panel. As clearly shown in Figures 12 and 14, the threaded sleeve 159 is provided with one or more longitudinally extending slots 159a, and the turning nuts 166 are provided with a corresponding number of inwardly projecting lugs 166a which engages within these slots. It will be evident that rotation of said nuts 166 will be operative to rotate the threaded sleeve 159 upwardly or downwardly within the threaded nut 161, the sleeve also moving upwardly or downwardly through the turning nuts 166. The turning nuts are conveniently accessible at the top of each guided panel, particularly when the panels have moved outwardly from between the two confining rails 45b, 45c into the folding zone Z. It will be seen that rotation of said turning nuts is operative to adjust the tension of the spring 147 by screwing the adjusting sleeve 159 so as to cause the lower spring anchorage 149 to be moved upwardly or downwardly within the panel. A washer 167 is preferably interposed between the turning nuts 166 and the supporting plate portion 162c, and a washer 168 is also preferably interposed between said nuts and the snubber spring mechanism through which lowering motion is transmitted to the panel.

The lowering mechanism comprises two lowering bars 171a, 171b which are disposed on opposite sides of the overhead track 45a, within the casing defined by the casing plates 94a, 94b (Figure 8). These lowering bars extend almost the entire width of the partition opening 40, so that they can transmit lowering movement to all of the extended panels simultaneously. Both bars oscillate downwardly and to the right in forcing the panels down against the floor, and oscillate upwardly and to the left in permitting the panels to rise back to their elevated positions. The bars swing on depending links which will be later described. As the bars swing downwardly, their lower edges engage two rollers 172 projecting from opposite sides of each hanger assembly just described. These rollers 172 might, if desired, have direct attachment to the associated panel, so that the panel would be caused to move downwardly with such positive force as the lowering bars would transmit to these rollers. I find it preferable, however, to interpose a cushioning or snubbing spring 173 between these rollers and the associated panel, so that after the panels have engaged the floor the continued downward movement of said rollers will compress the spring 173 for holding the panels resiliently pressed against the floor. It will be evident that the snubbing spring must have a greater deflection strength than the lifting spring 147 in order to be able to force the panel downwardly against the upwardly acting energy of the lifting spring in the panel lowering operation, but nevertheless the cushioning spring must not prevent the lifting spring from raising the panel in the panel lifting operation. These requirements are met by making the cushioning spring 173 much heavier and stiffer than the lifting spring 147, and arranging the cushioning spring within a cage or confining structure which permits said spring to be compressed but limits its expansion. That is to say, the spring and its confining cage constitute a self-contained compressible unit which is, in effect, floated between the lowering bars and the panel. This cage, designated 170 in its entirety, comprises a top snubber plate 174 and a bottom snubber plate 175, bearing against opposite ends of the spring. Both plates have sufficiently large central openings 174a and 175a to permit these plates to slide freely up and down over the threaded adjusting sleeve 159 and pintle hanger rod 51. The bottom plate 175 normally rests on the washer 168 disposed above the turning nuts 166. Completing the cage are the two guide posts or studs 145. The lower ends of said guide posts pass through apertured ears projecting from the bottom cage plate 175, and are threaded for receiving nuts 176 which engage the upper and lower sides of these ears for adjustably securing the plate to the posts. The upper cage plate 174 also has apertured ears which can slide freely downwardly along the posts. Upward movement of this upper plate is limited by shoulders 145a formed by the lower ends of enlarged heads 145b formed integral with the upper ends of the posts. These enlarged cylindrical heads 145b are capable of vertical sliding motion within the aforementioned end bosses 144 of the overhead carriage frame 126. Thus, the entire cage is guided for vertical movement with respect to the carriage. The two rollers 172 which are engaged by the lowering bars are supported at opposite sides of the top plate 174. These rollers are journaled on studs 177 which are secured to said plate, as by welding or in any other preferred manner, and which project outwardly therefrom, as best shown in Figure 8. If desired, ball bearings may be interposed between each stud and its roller. The top and bottom plates 174 and 175 may be provided with extrusions or other projections 174c and 175c for preventing movement of the ends of the cushioning spring 173 relatively to said plates.

It will be seen from the foregoing that by effecting relative manipulation between the top and bottom adjusting nuts 176 the cushioning spring can be compressed until its pressure exceeds the lifting force of the lifting spring 147. When the lowering bars 171a, 171b are forced down against the rollers 172 the cage 170 and snubber spring 173 are forced downwardly more or less directly with the rollers so that the panel is brought down into engagement with the floor, the force of the lifting spring being overcome by the greater strength of the cushioning spring. With further downward movement of the panel stopped and further downward movement of the rollers 172 continuing, the cushioning spring is compressed to a still greater degree, the top snubber plate 174 sliding downwardly along the guide posts 145. In the final closed position, the panel is held resiliently pressed against the floor under a relatively heavy pressure transmitted through the snubber spring, the lowering bars 171a, 171b and rollers 172 being held in their lowered positions during the entire time that the panel is locked against the floor. In the partition opening operation, the upward movement of the lowering bars 171a, 171b permits the rollers 172 and top plate 174 to rise. The first effect of this is to bring the plate up against the shoulders 145a on the guide posts, whereupon further expansion of the snubber spring is stopped and this spring and its cage become a self-contained unit having no action or reaction on the panel. Thereupon, the lifting spring 147 is free to raise the panel to its elevated position, the heads 145b of the guide posts merely sliding upwardly within the guide bosses 144. The upward movement of the panel is yieldingly stopped by the top snubber plate 174 engaging the lower ends of the guide bosses 144, which results in the pressure of the snubbing spring 173 becoming effective to oppose further upward movement of the panel, and such upward movement may be positively stopped by the heads 145b on the guide posts striking the upper ends of the sockets within the bosses 144, or by the lower end of the slot 155 in the sleeve 152 striking the cross pin 151. It will be evident that the interposition of the cushioning or snubbing spring 173 between the lowering bars and the panel accommodates variations in the floor level, track level, etc.

The hanger construction above described may be identical for all of the guided panels 48a 48, 48b. As an alternative construction, the threaded nut 161 and its retaining clip 165 may be dispensed with, and the hole 163 which passes through the supporting plate 162 may be threaded for coacting with the threads on the sleeve 159. In the preferred embodiment of my invention, I employ the construction illustrated for all of the guided panels, with the exception of the leading panel 48a, and in the case of that panel I employ the alternative construction wherein the hole 163 is threaded, such affording a better power transmitting connection between the wheeled carriage 53a and the panel, which is desirable for the leading panel. In this alternative construction, the tension of the spring can still be adjusted by rotation of the turning nuts 166.

Referring now to the manner of mounting the two lowering bars 171a, 171b, it will be seen from Figure 8 that each lowering bar is hung between pairs of companion suspension links 181 hanging down on opposite sides of the overhead track 45a. Each bar is pivotally connected to the two links by a pivot pin 182 passing through both links and the bar. These pairs of links have their upper ends pivotally supported on the bracket assemblies 98, 99, 101, as shown in Figure 17. The links may be provided at successive bracket assemblies or alternate assemblies, as desired. For supporting the links, a horizontal L-shaped bracket 183 is secured on each side of the track bracket 101. Referring to Figure 8, each L-shaped bracket lies between the pair of links 181 carried thereby, and has its inner end secured to the adjacent outer side of the track bracket 101, as by extending the weld 102 to include the L-shaped bracket, or by any other suitable attaching means. Referring again to Figure 17, the outer portion of the latter bracket has an upturned end 183' in which is mounted a transverse pivot pin 184. The upper ends of the companion links straddle this upwardly turned end of the bracket and have pivotal mounting on the pivot pin 184. As shown at the righthand side of Figure 17, this pivot pin extends through a slide block 185 having slidable mounting in a slot formed in the upturned bracket end 183'. The block is capable of being shifted horizontally by the appropriate manipulation of adjusting screws 186 which thread into opposite sides of the bracket arm and engage said block, such adjustment shifting the point of pivotal support of the upper ends of the links 181. In Figure 17 the lowering bars are shown in their raised positions in full lines and in their lowered positions in dotted lines. It will be noted that when the bars are swung down into their lowered positions, each lower pivot pin 182 is carried beyond the vertical plane of each upper pivot pin 184, into a past-center relation, whereby a toggle lock is established for holding each lowering bar in its lowered position. The ability to shift the upper pivot axes 184 by manipulation of the screws 185 enables the toggle lock effect to be made uniform at each pair of supporting links 181; it also enables the degree of lowering movement of each entire lowering bar, or any portion thereof, to be adjusted, if desired.

The lowering bars are actuated by the lowering machine 63 which is preferably mounted at the righthand end of the overhead guideway. Referring to Figures 18 to 22 inclusive, the righthand ends of both lowering bars 171a, 171b have similar link connection with the frame of this lowering machine through pairs of links 181' similar to the links 181. The lower ends of the links have pivotal connection with the bars by a through pin or bolt 182' which extends across from one lowering bar and pair of links to the other lowering bar and pair of links. For adjusting purposes, this pivot pin is receivable in different ones of the holes 187 provided in the ends of both lowering bars (Figure 19) The upper ends of the pairs of links 181' are pivotally supported on studs 184' projecting from opposite sides of the lowering machine frame. Oscillating motion is transmitted to the lowering bars through two driving links 188 which have their lower ends pivotally supported on the through pin 182' and which have their upper ends pivotally connected to a carriage traveling in the lowering machine, which carriage will be later described.

The frame 191 of the lowering machine is mounted substantially in continuation of the righthand end of the overhead track 45a, and has adjustable attachment thereto which enables the lowering machine to be shifted to different positions, spaced closer to or farther away from the end of the track. The lowering machine may be borne entirely by the track, or may have supplementary attachment to the overhead truss or to the adjacent end wall. The frame 191 is U-shaped, comprising side portions 191' which provide side guides and mount side bearings for the different operating mechanisms. Referring to Figure 18, these side portions have narrowed ends 191'' which are adjustably clamped to the outer sides of the track section 45a. Castings 192 provide guideways for the frame extensions 191'', to secure the aforementioned extensible adjustment between the frame 191 and the end of the track. One of these castings 192 is disposed at each side of the track, and has its upper and lower margins welded to the outer surface of the track, as indicated at 193. The inner surface of each casting 192 is formed with a rectangular groove and this defines a guideway through which the frame extension 191'' can slide. Each of the castings 192 is provided with two or more threaded bosses 194 adapted to receive threaded studs 195, and each of the frame extensions 191'' is provided with coacting groups of holes 196 adapted to receive the ends of the studs 195. As illustrated fragmentarily in section in Figure 21, the inner end of each stud 195 has a reduced extension 195a adapted to fit snugly in any one of the holes 196, and this reduced extension defines a shoulder on the stud which is adapted to exert clamping pressure against the outer face of the frame extension for securely clamping the frame extension against the side of the track 45a The above described attachment between the frame 191 and the end track section enables the frame to be shifted inwardly or outwardly to different positions projecting a greater or lesser distance from the end of the track, and to be securely clamped to the track in any such adjusted position. As previously remarked, the lowering machine may thus be supported entirely through this attachment to the track, or additional supporting means may be provided for securing the frame 191 to the truss 43 and to the side wall 42. A transverse reenforcing bridge 197 is secured by bolts 198 to the upper edges of the frame portions 191' to prevent spreading of the latter, this bridge being omitted from Figure 21 for clarity of illustration.

The drive chain 62 has the upper run of its loop traveling above the track 45a and has the lower run of its loop traveling through the track. This end of the loop is trained over a sprocket wheel 210 which is mounted between the side portions of the frame on a shaft 211 journaled in said side portions. Interposed in the lower run of the chain is a power transmitter 214 comprising in the main a long bar 214a which is mounted for endwise sliding movement on the top of the drive hanger assembly 53a associated with the outermost panel 48a. The outermost end of the chain is pivotally connected to said bar at 212 and the innermost end is pivotally connected thereto at 213, see Figures 25 and 26. The drive hanger assembly 53a is similar to the other hangers 53, except that it embodies additional parts for guiding the power transmitter 214 in endwise movement relative to the hanger, and for establishing an operative driving connection with said power transmitter. The long bar 214a of said transmitter member is disposed substantially medially over the top of the drive hanger carriage and is guided for endwise sliding movement relatively thereto by two guide clips 216 and 217. The frame casting 126 of this drive hanger carriage is especially formed with a rear lug 218 for supporting the rear clip and with a front lug 219 for supporting the front clip. The slide bar 214a of the power transmitter slides on the top of the lug 218, and the associated clip is of inverted U-shape to embrace the slide bar, having its lower side portions attached by rivets 221 to the lug 218 As best shown in Figures 23 and 24, the front lug 219 is provided on each side with sets of threaded holes 222 into which screw the threaded lower ends of shouldered studs 223. Two companion clutch dogs 224 are pivotally mounted on the upper portion of these studs for sidewise swinging movement. The hub portions of these two dogs are provided with inwardly extending abutment lugs 224a, the inner surfaces 224b of which are adapted to abut for limiting the inward swinging movement of the dogs toward each other. Said lugs only extend rearwardly to a point approximately on a transverse line extending between the dog axes, so that said lugs do not prevent outward separating motion between the dogs. The front surfaces 224c of the lugs operate as driving surfaces through which propelling force is transmitted when moving the partition sections to their folded position. The inwardly extending hook shoulders 224d at the outer ends of the dogs constitute driving surfaces through which propelling force is transmitted to the partition when moving the sections outwardly to the closing position. Helical springs 225 are coiled about the studs 223 below the head of said studs and have their opposite ends bearing against the guide clip 217 and against the dogs for normally tending to swing the dogs inwardly toward each other. The transmitter bar 214a moves endwise over the top surfaces of the two lugs 224a. The guide clip is of inverted U-shape, having its central portion embracing the top of the slide bar 214a and having laterally extending ears which are apertured for the studs 223, these ears bearing on the tops of the lug portions 224a, below the springs 225. The studs 223 may be withdrawn and reinserted into different ones of the threaded bores 222 for adjusting the position of the two clutch dogs 224 either forwardly or backwardly with respect to the leading edge of the wheeled carriage 53a.

Referring to Figures 25 and 26, the slide bar 214a is provided with outwardly extending projections or lugs 214b which extend downwardly below the slide bar. The rear surfaces 214c lie in the plane of the lug surfaces 224c on the clutching dogs and transmit inward or rearward propelling force through these surfaces to the drive hanger when folding the partition. The front surfaces 214d lie in the plane of the front clutching dog surfaces 224d, being beveled correspondingly with said dog surfaces, and transmit the propelling force through said surfaces and dogs to the drive hanger for extending the partition. The projecting members 214b may be originally formed as a part of the bar member 214a or may consist of plates welded to the sides of said bar member. A tripping finger 214e projects forwardly below the front portion of the slide bar. The rear portion of this finger extends along the under side of the slide bar and has a downwardly bent rear end 214f for the purpose of defining a latching pocket 214g below the slide bar and between the side plates 214b.

Referring to Figures 19 and 22, in the act of extending the partition to closed position, as soon as the leading partition panel has reached substantially its closed position, the dogs 224 are spread apart and the operative connection is then transferred from the transmitter member 214 to a rolling carriage 227 constituting part of the lowering machine 63. This carriage is movable endwise between the spaced side portions of the supporting frame 191, and, as best shown in Figure 19, is in the form of a casting comprising depending side walls 227a, an upper transverse web 227b and a lower transverse web 227c. A shaft 228 extends entirely through the outer portion of the casting and studs 229 project laterally from the inner portion of the casting. Carriage wheels 231 are mounted on said shaft and on said studs, to roll in guideways defined by horizontal slots 232 which are provided in the spaced side walls of the frame 191. As shown in Figure 20, these wheels have any suitable arrangement of inner or outer flanges for preventing sidewise displacement of the wheels out of the slots 232 in the back and forth rolling movement of the carriage. Spacing links 230 may be mounted on the outer ends of the shaft 228 and studs 229, beyond the wheels 231. An idler sprocket 233 is journaled on the central portion of the shaft 228 for guiding the chain 62 to the power transmitter 214. It will be noted from Figure 21 that the inner or rear end of the carriage 227 is provided with sloping surfaces 227d for spreading the latching dogs 224 outwardly, out of propelling connection with the shoulders 214d on the drive member 214.

A latch 234 is pivotally mounted in the lower part of the carriage 227 on a transverse pivot pin 235. The pivoted end of said latch has an upwardly extending lug 234a which is adapted to be engaged by the finger 214e on the drive bar 214, and the swinging end of said latch has an upwardly extending lug 234b which is adapted to swing up into the pocket 214g of the drive member. A transverse pin 236 in the swinging end of the latch has rollers 237 pivotally mounted thereon on opposite sides of the latch bar. These rollers cooperate with a keeper plate 239 which is secured by bolts 241 to a supporting plate 242 which extends transversely between the side portions 191' of the supporting frame 191. If desired, the connection established through the bolts 241 may be such as to permit endwise shifting of the keeper plate 239 relatively to the supporting plate 242, for adjusting purposes. The inward edge of the keeper plate has an upwardly beveled shoulder 239a which is adapted to engage against the surfaces of the two rollers 237 at points above the axes of these rollers, whereby a locking relation is established between the latch 234 and the keeper plate 239. Outward movement of the carriage 227 is transmitted to the lowering bars 171a, 171b through the previously described links 188. These links are disposed between the carriage 227 and the side frame members 191' and have their upper ends pivoted on the laterally projecting studs 229.

Referring to the operation of the lowering machine, when power is transmitted to the chain 62 for extending the partition to closed position, the transmitter member 214 is drawn outwardly along the track, pulling the drive hanger and leading panel 48a with it by virtue of the latched engagement of the shoulders 214d against the latch shoulders 224d. At this time, the lowering carriage 227 is at the inward limit of its movement, as illustrated in Figure 19, with the rollers 237 latched over the keeper plate shoulder 239a, and with the lowering bars 171a, 171b elevated. Substantially at the time that the leading panel reaches its fully closed position, the clutching dogs 224 engage the sloping surfaces 227d of the lowering carriage and are spread apart for releasing their engagement from the transmitter shoulders 214d. Concurrently therewith, the releasing finger 214e is moving in under the top web 227b of the lowering carriage and is engaging the lug 234a of the latch 234. Continued movement forces the latch upwardly for freeing the rollers 237 from the keeper plate shoulder 239a. This swings the latch lug 234b up into the pocket 214g of the transmitter member, and places the rollers 237 in position to roll along the top surface of the keeper plate 239. This position of the parts is illustrated in Figure 22, from which it will be seen that the transmitter member 214 has now released its engagement with the drive hanger of the end panel, and has established a coupled connection with the lowering carriage 227. The driving force may be transmitted to the carriage either through engagement of the transmitter with the lugs 234a or 234b of the latch 234, or through engagement of the drive shoulders 214d of the transmitter against the end of the carriage. The movement of the carriage to the right forces the lowering bars 171a, 171b downwardly, the same swinging on their supporting links 181, 181', as previously described. The adjustment of the limit switch controlling the operation of the electric motor 61 in this direction is such that the parts will stop after the lower pivot pins 182, 182' of the supporting links pass beyond dead center positions. This is illustrated in Figure 22, from which it will be seen that after the transverse pivot pin 182' passes into the dotted line position X, beyond the vertical axial plane Y, the lowering bars will be automatically locked in their lowered positions, so that upward pressure exerted by the lifting springs 147 and snubber springs 173 of each panel section cannot exert any force tending to drive the lowering carriage back in the opposite direction. When the motor is again started in the reverse direction, for drawing the partition sections inwardly to folded position, the reversed direction of movement of the transmitter member 214 is first transmitted to the lowering carriage 227 through the coaction between the pocket 214g and the latch lug 234b. As shown in Figure 22, those portions of the pocket and lug which are effective for transmitting propelling force at this time are sloped, as indicated at 214h and 234c, for exerting a downward camming force against the swinging end of the latch 234. However, this force cannot, at this time, force the lug 234b out of said pocket because the rollers 237 are now held in elevated position by their engagement on the top surface of the keeper plate 239. Hence, the carriage is compelled to travel with the transmitter 214, and consequently the links 188 are drawn inwardly for raising the lowering bars 171a, 171b to their elevated positions. As soon as the rollers 237 ride off the end shoulder 239a of the keeper plate, the camming pressure exerted between the surfaces 214h and 234c, and the action of gravity on the latch, result in the latch dropping down to bring its rollers 237 into hooked engagement under the beveled shoulder 239a. This action releases the lowering machine carriage from the moving transmitter 214, and also locks the lowering bars in their elevated position, by virtue of the locked engagement established between the latch 234 and the keeper plate 239. Continued inward movement of the transmitter member 214 carries the lateral drive projections 214b back into the space between the clutching dogs 224, these projections engaging the sloping outer ends of said dogs and spreading the same apart to receive the projections during the inward travel of the transmitter member above described. The shoulders 214c on these projections engage the coacting shoulders 224c on the dogs shortly after the driving connection with the lowering carriage has been uncoupled. Thereafter, the inward propelling force is transmitted to the drive hanger and to the end panel 48a through these surfaces 224c for causing the panels to be drawn inwardly to their folded position. It will be noted that during this entire inward travel, the shoulders 224d of the dogs 224 remain in position to be later engaged by the opposite driving shoulders 214d, for the later transmission of outward propelling motion to the end panel 48a, when the direction of rotation of the motor 61 is reversed for again closing the partition. With reference to the adjustability of the lowering apparatus, it will be noted that by placing the studs 223 in different ones of the holes 222, the time when the clutching dogs 224 will be released can be adjusted with respect to the outward movement of the leading panel 48a, whereby this panel can be made to assume a more advanced or more retracted position at the instant that the dogs 224 are released from the transmitter 214. Also, the inward and outward adjustability of the entire lowering machine 63 with reference to the end of the track 45a, obtained by changing the studs 195 to engage in different ones of the holes 196, affords a wide range of adjustment in predetermining the extent of outward movement of the outermost panel. These adjustments accommodate widely varying installation conditions. The adjustability afforded by placing the through pin 182' in different holes 187 in the ends of the lowering bars accommodates the inward and outward adjustment of the entire lowering machine with respect to the track, and may also be utilized to adjust the motion of the lowering bars.

Referring now to the driving mechanism 58 shown at the lefthand end of the overhead track, it will be seen from Figures 4 and 5 that this mechanism is mounted on a platform plate 244, which may be supported in any suitable manner, as by hanger bolts 245 secured at their upper ends to the truss 43 and secured at their lower ends to the plate 244. Corner irons 246 may be provided as abutting struts between the truss and the platform plate to increase the rigidity of mounting of the latter. The electric motor 61 is bolted to the base plate 244 and transmits power to a transverse shaft 247 through a speed reducing device generally indicated at 248. The latter preferably consists of a worm and worm wheel reduction drive, although it may consist of any other type of speed reducing gearing. A jaw clutch 249 controls the transmission of power from the shaft 247 to the previously described main driving member 59, which is in the form of a shaft operatively connected with the driven element of the jaw clutch 249. This shaft has its outer end journaled in a bearing 251, which is supported in any suitable manner, as by attachment to a plate 252 projecting from the end of the track 45a. A driving sprocket wheel 253 secured to said main drive shaft 59 drives the sprocket chain 62. The top run of the chain loop may be supported on one or more idler sprockets or rollers 254 journaled in brackets 255 mounted on top of the track 45a. Attention is directed to the provision of small conical projections 256 mounted at spaced intervals, several feet apart, over a portion of the top run of the chain (Figure 8). When the partition is folded back to open position, that portion of the chain then lying within the track 45a is unsupported by any roller carriages, but the chain is prevented from sagging down through the bottom opening of the track by the engagement of the conical projections 256 with the track bars 107. Indicated at 257 is the limit switch which automatically opens the circuit of the motor when the partition is extended and the panels have been forced down against the floor. This limit switch is actuated by the oscillating motion of the lowering bars 171a, 171b. Pivotally connected to one of the end supporting links 181 for the lowering bar 171a is a horizontal link 258 which is pivoted at 259 to a lever 260. The lever has suitable pivot mounting at 261 on a bracket 261' and its lower end is appropriately shaped to actuate a switch tripping roller 257' for opening and closing the limit switch 257. The parts are so arranged and adjusted that as the lowering bars 171a, 171b are oscillated to the right and downwardly for forcing the panels down against the floor the concurrent swinging motion of the lever 260 trips the limit switch substantially at the time that the lowering bars have passed beyond the overcenter relation of their supporting links 181, with the panels in pressure engagement against the floor. The reverse movement of the lowering bars to the left and upwardly permits the limit switch to restore itself to closed position. Adjustment of the limit switch may be effected by shifting the pivot pin 259 to different holes 259' in the end of the link 258. Indicated at 262 is the other limit switch for opening the motor circuit after the panels have been folded back into their open positions. The tripping roller 262' of this switch is actuated by a cam or like projecting member 263 mounted for endwise adjustability on a slide bar 264. This bar is guided in suitable brackets for horizontal sliding motion, and at its outer end has a downturned arm 264', as shown in Figure 6. Associated with the driving hanger 53a of the outermost panel 48a is a projection which is adapted to engage said arm and push the same inwardly. Preferably, this projection is obtained by providing a projecting end 177a on the stud which projects outwardly from the top snubber plate 174 for supporting the adjacent roller 172, as shown in Figures 6 and 21. In the folding operation, after all of the other panels have been folded and the outermost panel 48a is approaching its folded position, the projection 177a engages the slide bar arm 264' and pushes the slide bar inwardly, until, substantially at the time when the outermost panel has reached its completely folded position, the motion of the slide bar and its cam projection trips the limit switch 262. During the reverse or outward movement of the projection 177a the slide bar is restored to its original position by a suitable tension spring 265. Adjustment of the timing of the limit switch may be effected by shifting the cam projection 263 to different positions along the slide bar 264. The main control switch for controlling the opening and closing of the partition is conventionally indicated at 266 in Figure 1, and may be any suitable type of switch, key controlled or otheriwse, for closing the circuit of the motor 61. The circuit connections between this switch, the limit switches 257, 262, and the motor, including the arrangement for causing reversed rotation of the motor, are well understood in the art of electric door operators and the like and need not be described here. The manually actuated mechanism for transmitting rotation to the main driving member 59 will be later described.

I shall now describe the automatic folding mechanism 56 which coacts with the inner or trailing panel 48b for automatically deflecting or breaking the hinge joint between it and the next adjoining panel, and folding this inner panel back into right angle relation to the partition opening. As previously remarked, there is no need for the half-door or half-panel which has been an objectionable necessity in prior constructions, and there is no need for the manual pulling or pushing of the last few panels in breaking the hinge joints in the folding operation or in straightening the hinge joints in the extending operation, which have also been objectionable necessities in prior constructions, and this automatic folding mechanism 56 contributes largely in avoiding these objections. Referring to Figures 27 to 30, inclusive, the supporting plate 162 which is affixed to the inner panel 48b is provided with accessory parts to cooperate with a deflecting link mechanism. A fixed abutment 268 and a stop pin 269 (Figure 29) both project upwardly from this supporting plate, adjacent to one end thereof, and a pivot pin 270 attached to said plate pivotally supports a link 271 for oscillatory movement between the stops 268 and 269. A tension spring 272 has one end connected at 273 to a clip projecting from the link 271, and the other end of said spring is hooked to a clip 274 which is apertured to fit over the pendant rod 51 and adjusting sleeve 159 of the hanger supporting this end panel. This spring tends normally to hold the link 271 pressed up against the beveled surface of the stop projection 268. A pivot 275 at the outer end of said link pivotally connects the latter with a link 276 which is adapted to establish a point of reaction for this folding mechanism. In the type of installation illustrated in Figure 2, where the panels fold into a pocket 65, a rolling or shifting point of reaction is established by connecting this link with a carriage 277. The link is pivotally connected to the under side of said carriage on a depending stud 278. This carriage rolls along a track 279 which lies slightly below and to one side of the overhead supporting track 45a, and which is of a length to extend substantially the length of the pocket or well 65 into which the partition sections fold. As best shown in Figure 31, the upper guideway housing 94a, 94b has its entire bottom open throughout the length of the pocket 65. The bottom strips 95a, 95b and the fixed confining rails 45b, 45c terminate at the outer end of the folding zone. As I shall later describe in the embodiment of Figures 44 to 48 inclusive, folding confining rails may be disposed throughout the length of the folding zone. The track 279 for the carriage 277 is mounted within this portion of said upper casing by bolts 281 which pass through adjacent brackets 99 or through the casing side wall 94b. A supplementary track bar 279' extends parallel to the track bar 279 and has attachment thereto at spaced intervals by transverse bolts or rivets 282 extending through spacing members 282'. The carriage 277 comprises a plate 277a of L-shaped section, and projecting laterally from the upper portion thereof are pivot bolts 283 on which grooved rollers 284 are journaled, these rollers traveling along the top edge of the track bar 279. The laterally bent lower leg or flange 277b of the plate 277a is provided with upwardly extending pivot studs 285 and mounted on said studs are rollers 286 which travel between the spaced bars 279, 279' and stabilize the carriage against sidewise titlting. The stud 278, to which the link 276 is connected, is secured in this lower leg or flange 277b. Movement of the carriage in opposite directions is limited by the engagement of abutment lugs 277c on the carriage against rubber end stops 287, 287' secured adjacent to the ends of the tracks. The stop lugs 277c on the carriage may consist of tongues bent downwardly from the ends of the horizontal leg 277b. The rubber blocks 287, 287' are seated in angle-shaped clips 288 extending across the bottom sides of the track bars 279, 279' and each bumper block can be adjustably secured at any desired point along these track bars by the loosening of screws 288' which pass upwardly through the blocks and clips and tap into U-shaped clamps 289 which straddle the upper edges of the track bars 279, 279'.

Figure 27:
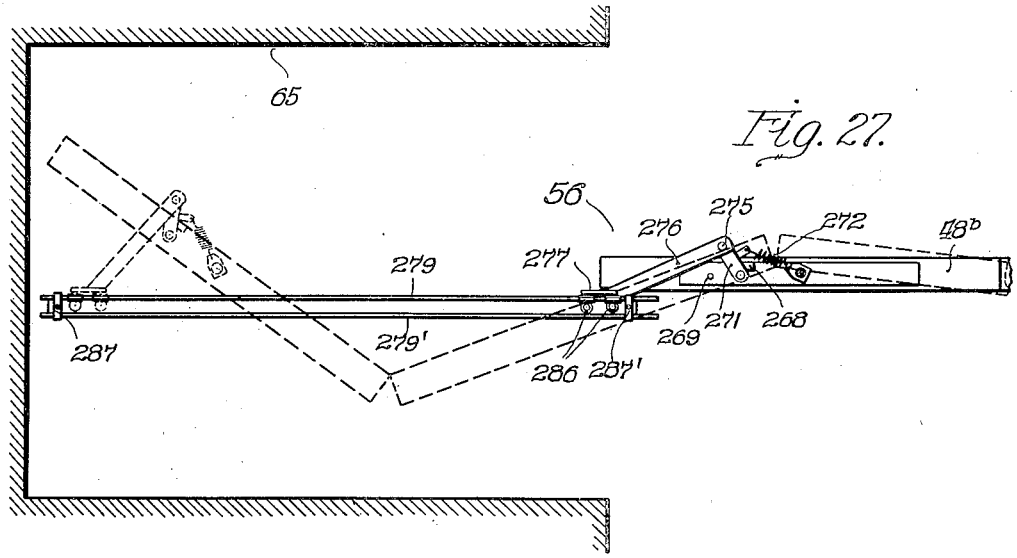
Figures 27 and 28 are plan and side elevational views respectively showing one embodiment of the automatic folding mechanism which is associated with the innermost panel.
Figure 28:
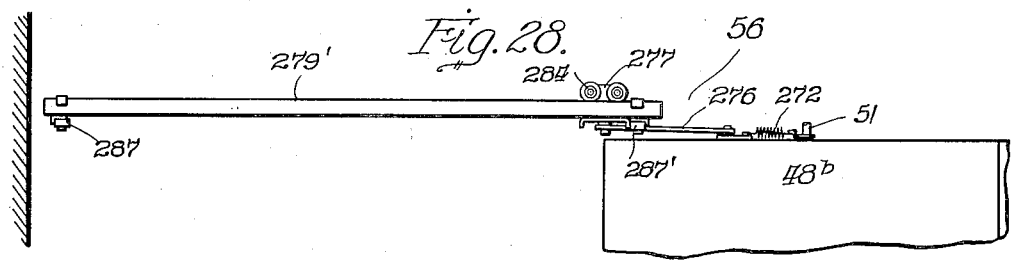
Figure 30:
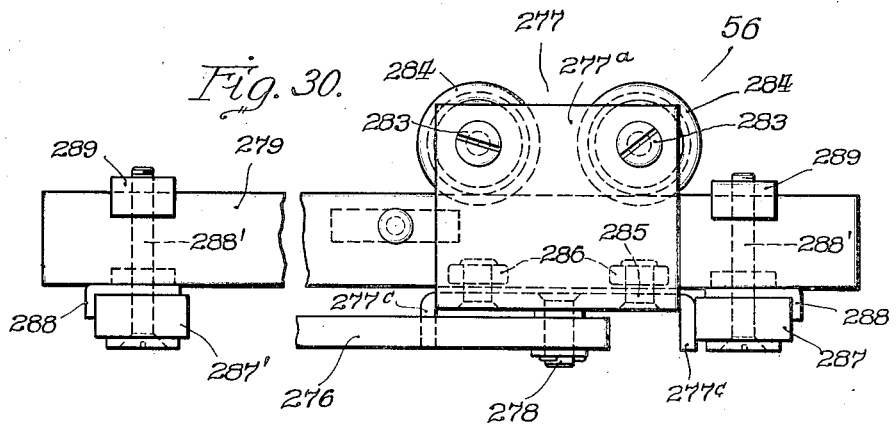
Figure 30 is a fragmentary side elevational view of the guide track and carriage associated with the embodiment of automatic folding mechanism illustrated in Figures 27 and 28.

Referring to Figure 27, it will be seen that when the entire partition starts to move inwardly along the overhead track, preparatory to the folding operation, the carriage 277 will be pushed along the track 279, 279' ahead of the inner panel 48b as the latter moves back into the end of the pocket 65. As soon as the carriage strikes the inner stop 287', it exerts a reacting force through the link 276, which transmits a sidewise deflection to the panel 48b through link 271 and stop 268. This lateral deflection starts this panel turning in the direction indicated by the dotted line position, breaking the hinge joint between this and the next adjoining panel With continued inward movement of the partition, the innermost panel 48b finally arrives at a folded position substantially at right angles to the guideways, and succeeding panels automatically fold into their proper positions alongside this innermost panel. In the reverse operation of extending the partition, the outwardly disposed or leading panels will first be drawn out of the pocket and thereafter the pull exerted on the hinged edge of the end panel 48d will start swinging this panel toward a position of edge-on alignment with the other panels, the carriage 277 meanwhile rolling outwardly along the track 279, 279'. Finally, the engagement of the carriage with the outer end stop 287 will transmit a pull through the link 276, which will positively compel the end panel 48b to swing into edge-on alignment with its next adjoining panel, if it has not already done so. The spring 212 yieldingly cushions the pull transmitted through the link 276 to the end panel, and the engagement of the lateral link 271 against the stop pin 269 establishes a positive pulling connection in the event that the spring tension is not adequate. This stop pin 269 also prevents any possibility of the pivot connection 275 between the two links swinging completely over to the other side of the panel or into any dead center alignment. It will be seen that the above described mechanism functions automatically, first, to break the joint between the inner and next adjoining panels in the folding operation and to deflect the inner panel into its folded position, and second to swing the inner panel back into edge-on alignment with the adjoining panel when the partition is being extended, thereby avoiding the necessity of any manual manipulation of the inner panels in the opening or closing of the partition.

For installations of the type illustrated in Figures 3 and 34 where the panels do not move back into a pocket but fold together adjacent to the outer side of the side wall 41, the link 276 of the above described automatic folding mechanism would preferably have its inner end pivotally mounted on a substantially fixed point of reaction instead of on the moving carriage 277. For example, the inner end of the link might be pivotally mounted on a pin 290 secured to the adjacent jamb structure or side wall In this embodiment, the operation of the automatic folding mechanism would be substantially the same as above described I shall now describe the automatic straightening mechanism 57 which acts on the more outwardly disposed group of panels during the extension of the partition for the purpose of automatically deflecting these panels towards edge-on alignment for entry into the guide space between the confining rails 45b, 45c. Referring to Figures 32 and 33, it will be seen that at the outer margin of the folding zone Z, the confining rail 45b at the left-hand side (as viewed looking outwardly in the partition opening) is longer than the confining rail 45c at the righthand side, by a distance which is preferably equal to approximately half the width of a panel, although this distance may be greater if desired. Fixedly secured to the end of the lefthand rail 45b is a bracket 291 on which a horizontal guide roller 292 is journaled. This guide roller is positioned to engage the side surfaces of the panels adjacent to their upper edges for initiating the deflection of the panels into the guideway between the confining rails. Projecting substantially coextensively from the end of the righthand rail 45c is a supporting bar 293 having attachment lugs 293' at its ends which are secured to the rail 45b at the outer end and to any other suitable support at the inner end. The bar is preferably of angle cross-section, and shiftable along this bar is a sliding bracket 294, also preferably of angle cross-section. Two bolts 295 passing through the bottom flange of the bracket are receivable in different holes 295' in the supporting bar for securing the bracket at different positions along the length of the bar. A pivot stud 296 extends downwardly from the bracket and has one or more horizontal guide rollers 297 journaled thereon. These rollers function like the roller 292 in deflecting the panels into alignment except that they engage the other side portions of the panels and at a more advanced point in the extension movement of the panels. Pivotally mounted on the pivot stud 296 above the rollers 297 is a swinging arm 298, the pivoted end of which is formed with a fork 298' affording spaced points of bearing support. A coil spring 299 encircles the pivot stud between the fork arms and has its lower end bearing against one fork arm and has its upper end secured to a bolt 301 fastened to the bracket 294. This spring tends to swing the arm 298 inwardly towards the plane of the guideway. A stop lug 302 projecting downwardly from the bracket limits this inward swinging motion to a position approximately coextensive with the confining rail 45c, or at a slight outward angle with respect thereto. The arm is preferably disposed above the top edges of the panels, and a pivot pin 303 extending downwardly from the swinging end of said arm carries a deflecting roller 304 which is in position to engage the side surfaces of the panels In the operation of the above described parts 292—304 constituting this embodiment of the automatic straightening mechanism 57, the roller 292 is engaged by the leading panel 48a which is supported on the hanger pintle 51; and said roller is also engaged by such succeeding pintle-supported panels 48 as require straightening for directed movement into the space between the confining rails 45b, 45c. The roller 292 engages those rearward portions of the pintle-supported panels as project to the left side of the guideway, and exerts a straightening force on said panels. The other roller 304, which is yieldably mounted, is engaged by the alternate panels 48' which are not pintle-supported, engaging such rearward portions of said panels 48' as project to the right side of the guideway, and exerting a straightening force on these panels. This roller can yield outwardly as it engages successive panels, so avoiding any shock in the engagement between said roller and the panels, but its spring pressure acting on the panels tends to swing them into positions still more closely approaching alignment with the guideway. By this time the panels have been swung into such close approximation of alignment that their righthand edges and surfaces will lie to the inner side of the axis of the guide rollers 297. Hence, these guide rollers 297 will be effective to complete any still remaining swiveling movement which may be necessary to direct the panels into the space between the confining rails 45b, 45c. The ability to adjust the bracket 294 along the supporting bar 293 enables the rollers 297 and 304 to be placed at more advanced or retracted positions with reference to the roller 292, for securing the most effective operation.

In addition to the automatic folding mechanism 56 and the automatic straightening mechanism 57, my invention also contemplates additional controlling mechanism for controlling those panels which lie in the folding zone Z when the partition is extended. It will be noted that these panels do not have the benefit of the confining rails 45b, 45c nor of the guide rollers 292, 297 and 304 for bringing them into exact alignment. Although the automatic folding mechanism 56 tends to align the innermost panel 48b with the guideways in the operation of extending the partition, there may be a tendency at times for this and succeeding panels in the folding zone to lie at a slight angle to each other, particularly where the folding zone Z is relatively wide, as in the case of a relatively long partition. One form of additional controlling mechanism is shown in Figures 37 and 38 and comprises a tension cable 306 which has one end connected to the innermost panel 48b and has its other end connected to tensioning means. This tensioning means is shown in the form of a weight 307, although a spring might be employed instead. The cable passes over a guide sheave 308 which is mounted substantially coextensive with the end of the track 45a. In Figure 37 I have shown the cable anchored to the roller carriage 53 of the innermost panel 48b, as by any suitable clamp attachment 309 (Figure 31). The tension imposed thereby on the innermost panel 48b serves two purposes. The primary purpose is to hold said innermost panel adjacent to the pocket, jamb, or sidewall 41 during the operation of straightening the panels into closed position. After the several panels have been straightened, the innermost panel 48b is free to move outward in any continued motion of the straightened partition to the right, such motion of the innermost panel merely pulling the weight 307 upwardly. The secondary purpose of the tension established on the innermost panel by this weight is to aid in straightening said panel, this action occurring because the inward pull exerted on the pintle 51 of that panel will necessarily exert a straightening force on said panel as the outer edge of the panel is drawn outwardly by the other panels moving outwardly to closed position. The inward pull exerted on the panel 48b by the weight also aids in effecting the proper folding of said panel as the partition is folded back to open position. In installations of the pocket type illustrated in Figures 2 and 27, 28, etc., where the innermost panel 48b travels back and forth throughout the depth of the pocket 65, the weight 307 merely rises and falls to accommodate such movement. In such installations, the tension transmitted by the cable to the inner portion of the partition is of assistance in the folding operation by tending to draw the inner panel or panels back into the pocket, so aiding the inward movement of the partition.

In Figure 39 I have illustrated another embodiment of automatic straightening apparatus which exerts a straightening force on those particular panels 48b, 48' and 48 which, when the partition is extended, lie within the folding zone Z. A cable 311 has its inner end dead-ended at the pintle 51 or roller carriage 53 of the innermost panel 48b, and is then passed alternately in zigzag relation around projections carried at the upper edges of succeeding panels, finally having its outer end dead-ended to a pin 312 on the panel 48'—or dead-ended to a pintle 51 or roller carriage 53 in the case of a pintle supported panel 48. The cable may be extended across the tops of as many panels as desired, preferably the number of panels such as lie in the folding zone Z when the partition is fully extended. The cable is extended around the right hand sides of small sheaves 313 which are mounted near the inner corners of the panels 48', and is extended around the left hand sides of small sheaves 314 which are mounted near the inner corners of the other panels 48. A tension spring 315 is interposed in this cable at any desired point in its length. It will be seen the spring tension established in the cable 311 will transmit lateral deflecting force to these panels for swinging them into alignment when the partition is extended. The folding of the panels is, of course accommodated by the yielding of the spring. When the embodiments of Figures 38 and 39 are used in the same construction the two cables 306 and 311 are preferably separate cables, although they might conceivably be one.

Referring now to the automatic folding jamb 66 which is employed in installations of the type illustrated in Figure 3, and referring particularly to Figures 34 and 35 which illustrate the details of this construction, it will be seen that the jamb comprises a stationary jamb rail 316 and a hinged jamb rail 317 both associated with a vertical supporting bar or like structure 318. The movable jamb rail 317 is connected by vertically aligned hinges 319 to an extension portion of the supporting framework of the jamb, this movable rail being capable of swinging out into approximately the dotted line position illustrated. The inner faces of the two jamb rails have rubber strips 321 secured thereto and adapted to contact with opposite side surfaces of the inner panel 48b, substantially from top to bottom thereof. It will be observed that the inner panel 48b is capable of longitudinal movement between the jamb rails 316, 317, even with the latter both engaging the panel. This accommodates any lengthwise expansion or contraction of the entire partition, such as might result from temperature, moisture, etc., the full line and the dash and dot line positions illustrating different typical positions which may be occupied by the inner panel within the jamb. Screwed to the top of the hinged jamb rail 317 is a plate 323 from which a vertical pivot stud 324 projects. A link 325 swings on this stud and has its other end pivotally connected by a pivot pin 326 with a slotted link 327. The inner end of this slotted link is pivotally mounted on a bolt 328 carried by the supporting frame structure 318. The slot in said latter link comprises front and rear portions 329a and 329b respectively, extending at a slight angle to each other. Extending down into said slot is a relatively long roller 331 mounted on a vertically disposed pin 332. This pin is secured in a bushing 333 which is welded in the corner of an angle extension projecting from a supporting bracket 334. The bracket has adjustable attachment to the end of the adjacent lowering bar 171a, whereby the bracket and roller 331 move directly with this lowering bar. The longitudinal portion of the bracket is provided with a slot 335 through which pass clamping bolts 336, which also pass through holes in the end of the lowering bar. An outwardly bent extension 337 on the bracket receives an adjusting bolt 338 (shown in plan in Figure 5), which also passes through a bracket clip 339 which is welded or otherwise secured to the side of the lowering bar. Nuts 341 screwing over this adjusting bolt enable the bracket 334 to be shifted inwardly or outwardly with respect to the end of the lowering bar, and the bracket is firmly held in any adjusted position by tightening the clamping bolts 336. The roller 331 is made of sufficient length so that it remains in the slot 329a, 329b throughout the entire range of raising and lowering movement of the lowering bar.

Referring to the operation of this folding jamb, it will be recalled from the preceding description that in the operation of extending the partition to closed position the lowering bars 171a, 171b are not swung down to their lowered positions until after the entire partition has been extended. In consequence thereof, the innermost panel 48b has been swung into its straightened position before the hinged jamb rail 317 can be closed against it. The subsequent downward movement of the lowering bar and its oscillation to the right causes the roller 331 to be moved to the right. This draws the roller 331 outwardly into the forward end 329a of the slot and results in the hinged jamb section 317 being swung into tight engagement against the side of the inner panel. In the reverse operation of opening the partition, the lowering bars are raised first, and this raising movement also involves an inward swinging movement to the left. Such results in the roller 331 moving back into the rear portion 329b of the slot and thereby exerting a deflecting pressure through said slotted link to the hinged jamb section 317, with the result that the jamb section is swung out to substantially the dotted line position illustrated. This frees the inner edge of the inner panel, whereby said edge may swing in clockwise direction, this being the direction of movement in which the inner panel is swung in turning it to folded position. The subsequent operation of again extending the partition to closed position results in this inner edge of the inner panel swinging back into aligned relation before the hinged jamb section 317 is closed against it, as previously described. The connecting link 325 may be provided with a projecting stop lug 325' for coacting with a depending stop lug 327' carried by the other link 327, which prevents the possibility of the pivotal connection 326 swinging beyond a dead center relation when the jamb rail 317 is swung back into its open position.

In installations of the pocket type illustrated in Figure 2, similar provision might also be made for the automatic operation of the pocket doors 65a, 65b. However, in the preferred embodiment, I arrange an electric switch or switches to be automatically actuated by the pocket doors and so connected in the control circuit of the motor 61 that the motor cannot be started to extend the partition until the doors are open and cannot be started to fold the partition until the doors are open. When the partition is in its extended position, the two doors 65a and 65b can be closed against the sides of the innermost panel 48b, and when the partition is folded a narrow supplementary door 65c, hinged to the door 65b, may be used to close the narrow space between the edges of the doors 65a, 65b.

Figures 36 and 37 illustrate the manually actuated driving mechanism for operating the partition. This mechanism comprises a shaft 351 journaled in bearings 352 attached to a supporting plate 353 which is mounted on the side wall 41 or on one wall of the pocket 65 or on other adjacent supporting structure. A sprocket wheel 354 on one end of said shaft drives a chain 355 which loops over a sprocket wheel 356 which is secured fast to the main drive shaft 59. It will be recalled from Figure 5 that this drive shaft is the main driving element which transmits power through the sprocket wheel 253 and chain 62 to all of the operating parts. The upwardly extending chain 355 is shown as passing over an idler sprocket wheel 357 which is mounted on the same shaft 358 that supports the cable sheave 308, the sprocket wheel and sheave being independently rotatable, however, on this shaft 358. Obviously, the run of the chain 355 from the sprocket wheel 354 to the sprocket wheel 356 may be arranged in numerous other relations to accommodate different conditions of installation. Rotation is arranged to be transmitted to the shaft 351 through a hand crank 361, which preferably has detachable coupling with the end of the shaft through a universal joint 362 and a coupling sleeve 363, the latter releasably engaging over the end of the shaft and coacting with a pin 364 or other clutch device on the shaft. When the partition is equipped with an electric motor drive, the manually operated driving mechanism may be provided for emergency purposes, as for operating the partition in the event that the power supply to the motor is accidentally interrupted. Where both types of driving mechanism are employed, it is desirable to disconnect the electric motor 61 and its reduction gearing 248 from the main driving element 59 when the partition is to be actuated by the manually operated driving mechanism. This purpose is served by the previously described jaw clutch 249, which operatively connects the shaft 247 with the driving element 59. The shiftable member of the clutch has a grooved hub or collar 366 in which engages a shifting yoke 367. An arm 368 extending from this yoke has a chain or cable 369 extending downwardly therefrom and passing around a sheave 371 mounted on the supporting plate 353 or on any other suitable supporting member. A tension spring 372 connects this chain or cable with a link 373 which is pivotally connected at 374 to a clutch releasing lever 375. Said lever is pivotally supported at 376 on the supporting plate 353, and its swinging end normally abuts against the stop pin 377 projecting from said plate. Swinging the lever downwardly transmits a pull through spring 372 and chain 369 to the lever 368 for disengaging the clutch, and when the lever is brought down against the lower stop pin 378 the pivot 374 is past center with relation to the lever fulcrum 376 so that the tension in the spring 372 yieldingly holds the lever in this position. At this time, the tension in the spring 372 exceeds the pressure of the spring 379 (Figure 5) which normally holds the clutch engaged, and hence the clutch is maintained disengaged as long as said lever 375 is in its lowered position. The shifting yoke 367 is mounted on a shaft 367' (Figure 5) which is extended to establish operative connection with a switch 381 which is operative to open the motor circuit. Hence, whenever the clutch 249 is disengaged for manual operation, the motor circuit is opened so that the motor cannot become accidentally energized. An electrically responsive brake for the motor 61 is indicated at 382, this brake serving quickly to stop the rotation of the motor as soon as it has been deenergized.

In Figures 40 to 43, inclusive, I have illustrated another modified construction incorporating: (1) improved means for deflecting the innermost panel 48b into folded position and for straightening this panel into aligned relation with the other panels when the partition is unfolded; and (2) automatic means for opening and closing the doors at the front end of the pocket 65. This modified construction has a slightly different arrangement for suspending the overhead track. Transverse plates or bars 385 are secured at spaced intervals to the undersides of the angle bars 43' constituting a part of the overhead truss 43, and depending from these plates or bars 385 are bolts 386. These bolts support a plate 387 which extends lengthwise of the guideway below the truss, the bolts having nuts thereon which engage above and below the plate for holding the latter in position. This plate may be of wood, and the top surface thereof has a lengthwise groove 388 to form a track for the top run of the chain 62. The bolts 386 also support crosswise strap bars 389 which have U-shaped depending brackets 101' secured thereto. Said brackets support the overhead track 45' substantially in the manner previously described in connection with Figure 8, this track being of slightly different form, comprising upwardly turned inner flanges 45'' which constitute the track surfaces.

The mechanism for folding and straightening the innermost panel 48b comprises a somewhat similar form of track 391, which likewise has closed sides and top, and an open slot running lengthwise in the bottom. Referring to Figure 41, the track 391 comprises a straight section 391a extending parallel to the main track 45', and comprises a curved inner section 391b which curves laterally to the left from the inner end of the straight section 391a. Said guide track is supported at spaced intervals along its straight and curved portions by U-shaped hanger brackets 392 which are bolted to the under side of a superstructure consisting of a lengthwise bar 393, a transverse bar 394 and a diagonal bar 395, all composed of wood, channels or the like. Z-shaped angle brackets 396 have their upper flanges secured to the adjacent truss bar 43' and have their lower flanges attached to the superstructure bars 393 and 394 for supporting the latter. An angle 397 attaches the outer end of the transverse bar 394 to an adjacent portion of the building structure.

Rolling within this guide or control track 391 is a roller 398 which has ball bearing on the upper end of a spindle 399 which passes down through the open slot in the bottom of the track. This spindle or pendant has vertically adjustable mounting in the outer end of a bracket 401 which is secured to the innermost panel 48b, the lower end of the pendant being threaded for receiving nuts 402, by the manipulation of which the roller 398 can be adjusted vertically relatively to the bracket 401. The bracket 401 is secured to the top of the innermost panel 48b in any suitable manner, such as by welding this bracket to a U-shaped strap 401' which embraces the top portion of the panel and is suitably secured thereto by screws or the like. It will be observed from Figure 41 that the bracket 401 is mounted at the inner end of the panel 48b, and the bracket is preferably formed to dispose the roller 398 at a point slightly inwardly beyond this end of the panel. In the operation of this folding and straightening apparatus, it will be evident that as the partition panels are drawn outwardly towards their closed position, from the full line position illustrated in Figure 41, the innermost panel 48b is finally drawn outwardly toward its position of alignment with the other panels. As the roller 398 travels outwardly through the curved portion 391b of the guide track, it causes the inner end of said panel to swivel to the right, bringing said panel into straight alignment with the other panels when the roller reaches the straight section 391a of the guide track. In the reverse operation of folding the partition, the roller 398, in being deflected laterally by the curved portion of the track, causes the innermost panel to execute an initial folding movement for starting the folding movement of the succeeding panels, and when innermost panel arrives at its innermost position it is in its proper crosswise folded position. The straightening and folding operations are both effected positively by the roller and guide track. The innermost panel can raise and lower with the remainder of the partition, in response to the operation of the lowering bars 171a, 171b, the guide roller 398 merely moving upwardly and downwardly within the guide track 391. I have shown this embodiment of straightening and folding mechanism as mounted within a pocket 65 for receiving the folded partition, such pocket type of installation being one to which this straightening and folding mechanism is readily adaptable, although it will be understood that said mechanism can also be employed in other installations not utilizing the pocket 65.

Referring now to the mechanism for automatically opening and closing the doors of the pocket 65, also shown in Figures 40-43, inclusive, it will be seen that the pocket in this instance is provided with two doors 65d and 65e, which are hinged at 405 to rails or supporting members at the sides of the pocket opening, the doors being arranged to swing inwardly to their open position. The doors are adapted to occupy their closed position, illustrated in dotted lines in Figure 41, when the partition is straightened out into its closed position, at which time a portion of the innermost panel 48b extends slightly into the pocket 65, lying between the edges of the two doors. These swinging edges of the doors are provided with flexible rubber astragals 406 which effect resilient pressure contact with the side surfaces of this innermost panel 48b. The two pocket doors are swung into this closed position at the conclusion of the partition closing operation. When the partition is to be folded back into its open position, the two doors are swung inwardly to their open positions illustrated in Figure 41 at the initiation of the partition opening operation. This opening of the doors is effected through cables 407 which have their front or inner ends anchored to angle bars 408, which angle bars are secured to the inner sides of the doors 65d and 65e and extend upwardly above the tops of the doors. From these angle bars, the cables 407 extend diagonally outwardly to the side walls of the pocket where they pass around guide sheaves 409 mounted on suitable brackets attached to the side walls of the pocket. These sheaves or pulleys 409 are provided with pulley shields 411 for confining the cables to the pulleys. The cables are thence extended rearwardly and downwardly over pulleys 412 which are supported in brackets 413 secured to the pocket side walls. Attached to the lower ends of said cables are weights 414. It will be evident that the action of these weights is that of normally tending to swing the two doors 65d, 65e to their open position, this arrangement being the same for both doors. Any suitable arrangement of stops 415 may be mounted on the side walls for limiting the opening movement of the doors substantially to the positions shown.

The doors are swung to their closed positions through the action of a second pair of cables 417 which are also anchored to the angle bars 408, adjacent to the upper ends thereof. These cables are looped around the front sides of pulleys 418, having stationary axis mounting above the panels, and the cables thence extend rearwardly toward the inner end of the pocket 65. The two pulleys 418 are journaled on bolts 419 which are fixedly secured at the two forward corners of a mounting plate 421, as shown in Figure 42. Pulley shields 422 are also carried by this plate and overlie the front portions of the pulleys 418 for confining the cables 417 in the grooves of said pulleys. The plate 421 is fixedly mounted below the overhead truss by bolts 423. Spacing blocks 424, of wood or the like, are interposed between each side portion of the plate 421 and the under sides of the truss angle bars 43' (Figure 40) and the bolts 423 pass through said plate, spacing block and angle bar flanges. The mounting plate 421 also supports the front end of a stationary guide rod 426 which is disposed centrally above the longitudinal grooves 388 provided in the top surface of the plate 387. As shown in Figure 43, the front end of the guide rod 426 has an upturned portion which is riveted to the plate 421. The rod is relatively long and has its rear end extending through an aperture in the vertical flange of an angle bar 428, being secured to this bar by a nut 429 screwing over the threaded end of the rod. The angle bar is secured by bolts 431 to the angle bars 43' of the overhead truss, any suitable spacing means 432 being interposed to support the angle bar 428 at the proper height. Mounted for sliding movement along the rod 426 is a slider 434 which, as best shown in Figure 42, comprises a guide boss 434a which has slidable mounting on the rod and from the sides of which laterally projecting arms 434b extend. The rear ends of the two cables 417 are attached to tension springs 435 which have their rear ends hooked into apertures in the outer ends of the slider arms 434b. It will thus be seen that inward or rearward thrusting pressure exerted against the slider 434 is operative to effect closing of the doors 65d, 65e through the springs 435 and cables 417. Traveling along the top of plate 387 is a chain propelled carriage 436 which is operative to impart inward or rearward pushing motion against the slider 434. As shown in Figures 40 and 43, said carriage is provided with outwardly disposed rollers 437 adjacent to its inner end, which roll on the top surface of the plate 387, to each side of the central groove 388. The top run of the chain 62 travels in this groove and is operatively connected to the carriage 436. One end of the chain is connected to a boss 438 projecting down from the rear portion of the carriage, and the other end of the chain is connected to a boss 439 projecting down from the front end of the carriage. As shown in Figure 40, the carriage is formed of an upwardly extending yoke portion which partially embraces guide rod 426 and provides arms or pusher surfaces 440 adapted to abut against the slider arms 434b on each side of the guide rod.

The understanding of this door closing mechanism will be simplified by bearing in mind that it is the travel of the top run of the chain which effects the closing of the pocket doors, and that the direction of travel of this top run of the chain is opposite to the direction of travel of the partition panels. Figure 42 illustrates the relation of the parts when the partition is straightened into its closed position. When the motor is energized to start the operation of folding the partition back into its open position, the chain operates through an appreciable travel for swinging the lowering bars 171a, 171b upwardly to their releasing positions, effected through the instrumentality of the lowering mechanism 63, before any rearward motion is transmitted to the panels. This initial travel of the chain means a motion of the top run of the chain in a direction to the right, and such motion draws the carriage 436 to the right. Accordingly, the slider 434 is permitted to slide to the right, slacking up on the cables 417 and permitting the doors 65d, 65e to swing inwardly under the tension constantly transmitted to the doors through the other cables 407. It will thus be seen that the pocket doors start their opening movement considerably before any endwise motion has been imparted to the partition panels. The parts may be so proportioned that the degree of chain travel necessary to effect the raising of the lowering bars is adequate to insure complete opening of the pocket doors before the partition panels start to move rearwardly. This proportioning is not essential, however, because the pocket doors can be completing their opening movement while the innermost panel 48b is moving inwardly preparatory to being swiveled in its folding operation. For example, it will be observed that when employing the inner panel folding and straightening mechanism illustrated in Figure 41, the inner panel moves through an appreciable distance before its guide roller 398 engages the curved portion 391b of the guide track for deflecting the panel, and the chain travel incident to this straight line motion of the inner panel can also be used to bring about the complete opening of the pocket doors before the panels start to fold. At the conclusion of the folding operation, the carriage 436 has separated completely from the slider 434. In the reverse operation of straightening the partition into closed position, the panels are all drawn out into a straight line before the return motion of the carriage 436 to the left brings the carriage into contact with the slider 434. The thrusting movement of the slider to the left draws the cables 417 rearwardly and pulls the pocket doors into their closed positions. As previously remarked, the entire movement of the doors may be effected during that interval of chain travel when the partition panels are being forced down by the lowering bars, or may be effected during that interval of chain travel when the innermost panel is moving in a straight line path and when the lowering bars are swinging down for lowering the partition panels. The provision of the tension springs 435 in the cables 417 avoids the necessity of precision timing by permitting some continued motion of the carriage 436 to the left after the pocket doors are closed, it being understood that the tension of these springs is capable of overcoming the weights 414.

It will be understood that each of the above described mechanisms illustrated in Figures 40, 41, 42 and 43 can be employed in conjunction with any of the embodiments previously described. The provision of the automatically operating pocket doors results in a pocket type of partition which is fully automatic.

In Figures 44 to 48, inclusive, I have illustrated a construction employing folding confining rails or stop rails which extend lengthwise of the folding zone adjacent to the upper track 45a. The stationary confining rails 45b and 45c terminate at the outer end of the folding zone Z. This is for the purpose of avoiding interference with the upper edges of the panels as the panels swivel in the folding zone during the folding and straightening operations. The folding confining rails, designated 45bb and 45cc, when in their lower or operative positions, extend substantially coextensively from the ends of the fixed confining rails 45b and 45c substantially throughout the length of the folding zone. The operation of these folding rails is such that they are arranged to swing up automatically to a position where they will not interfere with the swiveling motion of the panels in the folding zone during the operations of folding the partition or straightening the partition. In the preferred construction illustrated, this automatic operation is effected by having the movement of the folding rails responsive to movement of the lowering bars 171a, 171b. The two folding rails are substantial duplicates in their general construction, each comprising a metal plate or strip 450 bent to form the two angularly disposed flanges 451 and 452 and the narrow marginal flange 453. An ornamental molding strip of wood 454 fills the outer side of the bent angle plate and is suitably secured thereto at spaced points, as by screws passing through the molding strip and threading into tapped holes in the plate 450. Each folding rail is pivotally supported at spaced points along its length on pivot pins 456 around which the rail swings. The full line positions illustrated in Figure 45 show the rails swung upwardly for clearing the edges of the panels during the swiveling motion of the panels, and the dotted line positions of the two rails illustrate the rails embracing the top edges of the panels corresponding to a closed position of the partition. The pivot pins 456 are mounted in the lower ends of supporting brackets 457 located at spaced points along the length of the folding zone, each pin extending through its respective bracket and projecting from opposite sides thereof. The brackets 457 may be mounted in any suitable manner so that they will, in effect, be supported from the overhead truss structure 43. In the preferred arrangement illustrated, the brackets have vertically extending attaching flanges 457' which are bolted, riveted or otherwise secured to the vertical side legs of the inverted U-shaped brackets 99'. The latter brackets are similar to the brackets 99 of Figure 8, except that they do not have the inwardly extending lower flanges 99a. Slotted openings 458 are provided at spaced intervals through the plate portion 450 and through the trim portion 454 of the folding stop rail for accommodating the brackets 457. As shown in Figure 46, the oppositely projecting ends of the pivot pins 456 are mounted in angle shaped bracket clips 459 which are mounted back to back on opposite sides of each supporting bracket 457. Said clips are secured to the inner or back surfaces of the flange portions 451 by rivets 461 which pass through slots 462 in said flange portions 451.

The righthand side of Figure 45 is taken on a section plane to illustrate the pivotal mounting of the folding rails, and the lefthand side of said figure is taken on a different section plane to illustrate the operative connection which causes the folding rails to pivot. Referring now to the operating mechanism, each folding rail has a bracket 464 secured to the outer side of the flange portion 451. The ends of said brackets are secured by rivets 465 passing through slots 466 in the flange portion 451, the portion of said bracket intermediate said ends being bent outwardly to form a U-shaped crank portion 464'. A transverse slot 467 is provided in the flange portion 451 and in the wood trim 454 in the plane of the crank portion 464' for accommodating the link attachment to said crank portion. The link attachment consists of a link 468 made up of two straps of metal having their lower ends welded together and extending down into the crank portion 464'. A pivot pin 469 passes through the side walls of said crank portion and through the lower end of the link 468. The provision of the slots 462 and 466 is for the purpose of enabling the brackets 459 and 464 to be adjusted longitudinally, as by tapping with a hammer, in order to align these bracket properly with the supporting brackets 457 and with the operating link 468.

At the upper end of the link 468, the two straps composing said link are twisted and arranged in spaced relation to form the two side arms 468' of a yoke, as shown in Figure 45. Said yoke arms have a universal joint connection with one end or arm of a bell crank lever 471. As shown in Figure 47, this universal joint consists of a ball 472 and a spherical socket therefor made up of two rings 473. Pins 474 project from opposite sides of the ball 472 and have pivotal mounting in the ends of the yoke arms 468'. The two rings 473 have matching spherically-shaped recesses which form a spherical socket engaging over the ball 472. The rings are secured in an opening in the bell crank lever by spot welding, staking, or in any other preferred manner. The end 471' of the lever in which said rings are mounted is off-set inwardly from the other portion of the lever, as illustrated in Figure 45.

Referring to Figure 46, the lower corner of the lever is pivotally supported on a pivot pin 475 which is mounted in the end of a supporting arm 476. Said arm is welded to one of the depending side legs of an adjacent bracket 99'. The upper corner of the bell crank lever carries a pin 477 which extends through a slot 478 in an actuating link 479. A tension spring 481 extending alongside the link 479 has one end attached to the pin 477 and has its other end attached to a fixed pin 482 carried by the link, this spring serving normally to retain the pin 477 at the right-hand end of the slot 478. The other end of said link has a slot 483 engaging over a bolt 484 which is pivotally mounted in the adjacent lowering bar 171a. As shown in Figure 48, said bolt has a large shank portion 484a which has rotatable bearing support in a circular aperture in the lowering bar 171a. A reduced threaded end 484b projects outwardly through the slot 483 in the link 479 and carries plain washers 485 on opposite sides of the link and also carries a lock washer 486 cooperating with the nut 487. The friction lock afforded by the nut 487 permits the link 479 to be shifted lengthwise for enabling the bolt 484 to be disposed in any adjusted position along the length of the slot 483, and when the nut 487 is tightened the bolt is clamped at that point in the slot. The pivotal motion between the link 479 and the lowering bar 171a occurs between the bearing portion 484a of the bolt and the lowering bar. It will be understood that the above described construction of operating mechanism is duplicated on the other side in the case of the other folding stop rail 45cc and its associated lowering bar 171b.

Referring now to the operation of the folding confining rails, it will be recalled that after the partition has been moved outwardly to its fully extended position, the lowering bars are actuated for forcing the partition panels downwardly. The movement of the two lowering bars to the right (Figure 46) causes each bell crank lever 471 to oscillate in a direction for thrusting downwardly through the link 468 and thereby swinging the stop rails inwardly into their closed positions, substantially as illustrated in dotted lines in Figure 45. In such closed positions, the rails either have actual contact or proximate contact with the partition panels, as desired. The motion of the link 479 is transmitted to the bell crank lever through the tension spring 481 so that each confining rail is pressed into its closed position under spring tension. Continued motion of the lowering bars 171a, 171b to the right (Figure 46) is accommodated by the lost motion relation between the pin 477 and the slot 478, the tension springs 481 meanwhile maintaining the two confining rails pressed inwardly to their closed positions. In the reverse operation of folding the partition panels back to one side of the doorway, the lowering bars are first oscillated towards the left for permitting the panels to move upwardly. This motion of the lowering bars oscillates the bell crank levers 471 in the reverse direction and swings the two confining rails 45bb, 45cc upwardly to their open positions, illustrated in full lines in Figure 45. In these positions, the top edges of the panels clear the under sides of the confining rails so that the panels can swivel in the folding operation. In constructions such as are shown in Figure 3 wherein the panels are folded together at one side of the opening, that is, in constructions where there is no pocket for receiving the panels, the confining rails preferably extend the entire length of the folding zone Z, whereby to close the space above the panels in this zone when the partition is extended to its closed position. In constructions such as are illustrated in Figure 2, wherein the folded panels are nested in a pocket 65, the folding confining rails are extended along that portion of the folding zone lying outside of the pocket, and may, if desired, be extended back into the pocket, although there is no material advantage in doing so. One folding rail may be extended beyond the other at the outer end of the folding zone for accommodating the folding motion of the panels at this point. The wood side plates 94a, 94b are arranged to complete the trim of the upper guideway on the outer sides of the brackets 99' and on the outer sides of the mechanisms which actuate the folding confining rails. As shown in Figure 45, these trim plates may be scarfed out at 491 to clear the working parts. If desired, the vertical motion of each lowering bar may be guided by inverted U-shaped guide brackets 492 (Figure 45) which are secured to the track brackets 101 at one or more spaced points. It will be understood that this mechanism, including the folding confining rails illustrated in Figures 40 to 48, inclusive, can be employed in conjunction with any of the embodiments previously described.

While I have illustrated what I regard to be the preferred embodiment of my invention, nevertheless it will be understood that such is merely exemplary and that numerous modifications and rearrangements may be made without departing from the essence of the invention. For example, the driving mechanism 58 including the motor 61 and associated mechanism need not be mounted at the level of the overhead track 45a, but might be mounted at a lower point on the side wall 41, or lower portion of the pocket 65, with the chain drive extending up to the track. Also, while in the pocket type of installation I prefer to have the innermost panel 48b free for movement from the inner end of the pocket out to the outer end, such saving the expense of one or more additional panels otherwise necessary to span the depth of the pocket, it will be understood that these additional panels might be added, with the innermost panel then remaining in the inner end of the pocket at all times. Furthermore, while the use of the sprocket chain 62 is preferable because of the reduced likelihood of stretching, this chain might be substituted by a steel cable or other flexible means as the power transmitting loop. The electric circuits for the motor 61 and the controls therefor are deemed to be sufficiently well understood by one skilled in the art as not to make a detail description thereof necessary.

I claim:

1. In a partition, the combination of a supporting means, a series of partition panels movable along said supporting means to and from extended position, and means reacting against said supporting means for simultaneously moving said panels substantially vertically when in their extended positions.

2. In a folding partition, the combination of an overhead guideway, a series of partition panels movable along said guideway, means for holding said panels elevated when moving between their folded and extended positions, and lowering mechanism associated with said overhead guideway and operative to effect concurrent downward movement of said panels when in their extended positions.

3. In a folding partition, the combination of a guideway, a series of partition panels movable horizontally along said guideway to folded position and to extended position and movable vertically relatively to said guideway, and driving mechanism operative to move said panels between said folded and extended positions and also operative to move said panels vertically.

4. In a folding partition, the combination of a guideway, a series of partition panels movable along said guideway to folded position and to extended position, means for holding said panels elevated while moving between said positions, propelling mechanism for propelling said panels between folded and extended positions, lowering mechanism for lowering said panels, a driving device, and means cooperating with said mechanisms and with said driving device for selectively transmitting propelling motion and lowering motion to said panels.

5. In a folding partition, the combination of an overhead guideway, a series of partition panels movable along said guideway to folded position and to extended position, a rotatable driving member, a flexible member arranged in a loop extending along said upper guideway and adapted to be driven by said driving member, a power transmitting member connected with said flexible member, lowering mechanism for lowering the panels, and means for selectively connecting said power transmitting member with one of said panels for propelling the latter, and with said lowering mechanism for lowering the panels.

6. In a partition, the combination of a series of partition panels, a guideway therefor, guide members engaging with said guideway and associated with a plurality of said panels, springs coacting with said panels and guide members and arranged to exert an upward pressure on said panels, and means movable generally horizontally relative to said guideway for lowering said panels simultaneously against the upper pressure of said springs.

7. In a folding partition, the combination of a guideway, a series of partition panels movable along said guideway to folded and extended positions, said panels being also movable vertically, lowering mechanism for lowering said panels when in their extended position, and yieldable means coacting with said lowering mechanism and arranged to yield when said panels have reached their lowermost positions.

8. In a folding partition adapted to close a partition opening, the combination of a guideway, a series of partition panels movable along said guideway to folded position and to extended position, means tending to hold said panels in elevated positions, individual lowering members operatively connected with a plurality of said panels, a lowering bar extending substantially the width of the partition opening and operative to exert downward pressure on all of said individual lowering members substantially simultaneously, and means for actuating said lowering bar.

9. In a folding partition, the combination of a guideway, a series of partition panels movable outwardly along said guideway to extended position and movable inwardly along said guideway to folded position, said series including an inner panel mounted for both translation along said guideway and swiveling movement with respect thereto, means for moving all of said panels linearly along said guideway, and folding mechanism arranged to become effective while the innermost panel is moving linearly for deflecting latter toward its folded position.

10. In a folding partition, the combination with an opening in a building, of a guideway extending substantially the width of said opening, a series of partition panels adapted to be folded together in a folding zone at one side of said opening, guide members for said panels movable along said guideway, said guide members defining a swiveling axis for each of their associated panels disposed substantially midway between the edges of the panel, the innermost panel of the series having both edges free for rotation relatively to the adjacent side of said opening, automatic folding mechanism for deflecting said innermost panel towards its folded position as the other panels are moved inwardly towards said folding zone, and means for causing vertical movement of said panels when in their extended position closing said opening.

11. In a folding partition, the combination of a guideway, a series of partition panels movable outwardly along said guideway to extended position and movable inwardly along said guideway to folded position, means supporting said panels for swiveling movement, whereby said panels are enabled to swivel to positions at an angle to said guideway in being folded together, and link means pivotally connected between the innermost panel of the series at a point in laterally offset relation to the plane of said panel and a point of reaction for initially deflecting and further swiveling said innermost panel towards its folded position.

12. In a folding partition, the combination of a guideway, a series of partition panels guided thereby, said panels being movable into folded position extending at an angle to said guideway and being movable into extended position substantially parallel to said guideway, the innermost panel of said series being capable of translational movement along said guideway, and means coacting with the innermost panel of the series for automatically deflecting said panel towards its angular position when the partition is being folded and for automatically deflecting said innermost panel toward its parallel position when the partition is being extended, said means having a range of movement commensurate with the translational movement of said innermost panel.

13. In a folding partition, the combination of a guideway, a series of partition panels movable outwardly along said guideway to extended position and movable inwardly along said guideway to folded position, the innermost panel of said series being capable of translational movement along said guideway, link means operatively connected with said innermost panel for controlling the angular position of said panel with respect to said guideway, and means for causing lowering movement of said panels when in their extended position.

14. In a folding partition, the combination of a guideway, a series of partition panels movable outwardly along said guideway to extended position and movable inwardly along said guideway to folded position, and mechanism for controlling the angular position of the innermost panel of the series with respect to said guideway comprising a link operatively connected with said innermost panel, a carriage operatively connected with said link, a track along which said carriage is movable, and means controlling the movement of said carriage along said track.

15. In a folding partition, the combination of a guideway, a series of partition panels movable outwardly along said guideway to extended position, and movable inwardly along said guideway to folded position, said guideway comprising two spaced confining rails adapted to embrace the upper portions of said panels for preventing swiveling movement of the outer panels when in extended position, and automatic straightening means including a spring pressed arm operative to exert pressure against said panels for urging them into alignment with the space between said confining rails as said sections are moved outwardly along said guideway.

16. In a folding partition, the combination of a guideway, a series of partition panels movable outwardly along said guideway to extended position and movable inwardly along said guideway to folded position, and means exerting a pull on one of the inner panels tending to move it toward the inner end of said guideway.

17. In a folding partition, the combination of a guideway, a series of partition panels movable outwardly along said guideway to extended position and movable inwardly along said guideway to folded position, a cable operatively associated with a plurality of said panels at the inner end of the series, and spring means coacting with said cable tending to straighten said latter panels into alignment while said panels are being moved outwardly to their extended position.

18. In a folding partition, the combination with an opening, of a guideway extending substantially the width of said opening, a series of partition panels mounted for opening and closing movement along said guideway, said panels adapted to be folded together in a folding zone at one side of said opening, and a jamb structure at the latter side of said opening comprising a movable jamb plate mounted for movement into and out of engagement with the side of the innermost partition panel.

19. In a folding partition, the combination of a guideway, a series of partition panels movable outwardly along said guideway to extended position and movable inwardly along said guideway to folded position, and mechanism for automatically exerting a straightening force on the inner portion of said partition as the panels are moved outwardly to extended position, said mechanism comprising a link operatively connected with the innermost panel of said series, a carriage operatively connected with said link, a track along which said carriage is movable, and stop means limiting movement of said carriage as the partition is moved outwardly to extended position.

20. In a motor driven folding partition, the combination of a guideway, a series of partition panels, motor driven mechanism operative to automatically move said panels outwardly along said guideway to extended position and operative to automatically move said panels inwardly along said guideway to folded position, and mechanism energized by the inward movement of said panels and for automatically deflecting the innermost panel of the series out of a parallel position with said guideway and towards its folded position as the panels are moved inwardly.

21. In a folding partition, the combination of a guideway, a series of partition panels movable along said guideway to folded position and to extended position, and mechanism for folding and straightening one of said panels comprising a guide member carried by said panel and a guide track separate from and comprising a curved portion mounted adjacent to said guideway, said guide member being in constant engagement with said guide track for automatically guiding said member through a panel deflecting path.

22. In a folding partition, the combination with a structural opening, of a guideway associated with said opening, a series of partition panels movable along said guideway and adapted to be folded together in a folding zone at one side of said opening, a roller carried on the innermost panel of the series and spaced in laterally offset relation with respect to said panel, and a guide track for said roller disposed adjacent to said folding zone and mounted laterally with respect to the median plane of said guideway, said guide track comprising a curved portion for deflecting the roller through a path such as will cause said innermost panel to be folded to a position substantially at right angles to said guideway.

23. In a folding partition, the combination of a guideway, a series of partition panels movable outwardly along said guideway to extended position and movable inwardly along said guideway to folded position, a pocket at the inner end of said guideway for receiving the folded panels, door means for closing said pocket, and mechanism for automatically controlling the position of said door means in response to the operation of said partition.

24. In a folding partition, the combination of a guideway, a series of partition panels movable outwardly along said guideway to extended position and movable inwardly along said guideway to folded position, a flexible member extending lengthwise of said guideway and adapted to cause outward and inward movement of said panels, means for actuating said flexible member, a pocket at the inner end of said guideway for receiving the folded panels, a door movable into and out of closed position with respect to the opening into said pocket, and means responsive to the motion of said flexible member for controlling the position of said door.

25. In a folding partition, the combination of a guideway, a series of partition panels movable outwardly along said guideway to extended position and movable inwardly along said guideway to folded position, motor actuated mechanism for propelling said panels, manually actuated mechanism for propelling said panels, and means for disconnecting one of said mechanisms from said panels while the other mechanism is being used.

26. In a folding partition, the combination of a floor track, a series of partition panels movable along said floor track to folded position and to extended position, a strip of yieldable material carried by said floor track, a strip of yieldable material carried by said partition, and means operative to raise and lower said partition panels for effecting relative vertical movement between said strips of yieldable material to move the latter into and out of engagement.

27. In a folding partition, the combination of a guideway, a series of partition panels movable outwardly along said guideway to extended position and movable inwardly along said guideway to folded position, a confining member adapted to lie alongside certain of said panels when said panels are in extended position, and means for moving said confining member to a non-interfering position when said panels are to be swiveled relatively to said guideway.

28. In a folding partition, the combination of a guideway, a series of partition panels movable along said guideway and adapted to be folded together in a folding zone at one end of said guideway, a pair of confining rails disposed on opposite sides of said guideway in said folding zone, said confining rails adapted to engage the upper portions of certain of said panels when said panels are in extended position, and means for automatically moving said confining rails upwardly to a position where they will clear the top edges of said panels preparatory to causing said panels to be swiveled relatively to said guideway.

29. In a folding partition, the combination of a guideway, a series of partition panels movable outwardly along said guideway to extended position and movable inwardly along said guideway to folded position, lowering mechanism operative to effect downward movement of said panels when the partition is in extended position, a confining member adapted to lie alongside certain of said panels when the panels are in said extended position, and means responsive to said lowering mechanism for moving said confining member to a non-interfering position preparatory to causing said panels to be swiveled relatively to said guideway.

30. In a folding partition, the combination of a guideway, a series of partition panels movable outwardly along said guideway to extended position and movable inwardly along said guideway to folded position in a folding zone at one end of said guideway, the innermost panel of said partition being capable of translational movement through the folding zone, and means secured to said innermost panel and shiftable with the latter in its translational movements and operative to exert a straightening force on said partition panels at the outer end of said folding zone and operative to exert a swiveling force on said innermost panel when said means reaches the inner end of said folding zone.

31. In a folding partition, the combination of a guideway, a plurality of partition panels movable outwardly along said guideway to extended position and movable inwardly along said guideway to folded position, said panels also being movable vertically, spring means suspending said panels from said guideway, lowering mechanism for lowering said panels when in their extended position, said spring means being adapted to yield as the panels are lowered, and yieldable means coacting with said lowering mechanism adapted to yield when the panels have reached their lowermost position.

32. In a folding partition, the combination of an overhead guideway, a series of partition panels movable along said guideway, spring means holding said panels in elevated position, a lower guideway, pintles in the lower ends of said panels, spring means maintaining said pintles in engagement with said lower guideway, and lowering means operative to move said panels downwardly against the pressure of both of said spring means.

33. In a folding partition, the combination of a guideway, a series of partition panels movable along said guideway to folded position and to extended position, yieldable means for holding said panels elevated while moving between said positions, propelling mechanism for propelling said panels between folded and extended positions, lowering mechanism including longitudinally shiftable means adapted to be engaged with the several panels for moving the same downwardly against the action of said yieldable holding means, and means releasably associated with said propelling mechanism for connecting the latter with said longitudinal shiftable lowering means when the panels have reached one of their positions.

34. In a folding partition, the combination of a guideway, a series of partition panels movable along said guideway to folded position and to extended position, and movable substantially vertically relative to said guideway, a lowering bar shiftable both longitudinally and vertically and disposed adjacent the upper portions of said panels, means carried by the latter for engagement by the lowering bar when the panels are in their extended position, propelling mechanism for moving said panels from their folded position to an extended position, means for releasing said propelling mechanism from said panels and connecting the same with said lowering member to shift the same longitudinally and downwardly to move the panels downwardly, and means for driving said propelling mechanism.

35. In a folding partition, the combination of a guideway, a series of partition panels movable along said guideway to folded position and to extended position, and movable substantially vertically relative to said guideway, a drive hanger operatively connected with one of said panels, a lowering member for moving the panels vertically, a driving device, a power transmitter driven by said driving device, coacting clutch parts for operatively connecting said power transmitter with said drive hanger, coacting clutch parts for operatively connecting said power transmitter with said lowering member, and means for automatically controlling the engagement and release of said clutch parts so that the lowering member is not actuated until said panels have been moved into their extended position.

36. In a folding partition adapted to close a partition opening, the combination of a guideway, a series of partition panels movable along said guideway to folded position and to extended position, carriages for certain of said panels movable along said guideway, spindle means supported by each of said carriages, said panels being mounted on said spindles for both vertical and swiveling movement relative thereto, means reacting against said spindles tending to hold the panels in elevated position, and individual lowering members mounted on said carriages and arranged to engage said panels in both extended and folded positions for controlling the position of the panels associated therewith.

37. In a folding partition, the combination of a guideway, a series of partition panels movable outwardly along said guideway to extended position and movable inwardly along said guideway to folded position, said guideway comprising a confining rail for preventing swiveling movement of the outer panels when the latter are in extended position, and means acting against said panels as they are moved outwardly toward said confining rail for urging said panels into positions substantially parallel with respect thereto.

38. In a folding partition, the combination of a guideway, a series of partition panels movable outwardly along said guideway to extended position and movable inwardly along said guideway to folded position, and a tension cable operatively connected with one of the inner panels tending to move it toward the inner end of said guideway.

39. In a folding partition, the combination of a guideway, a series of partition panels movable outwardly along said guideway to extended position and movable inwardly along said guideway to folded position, means pivotally connecting said panels together to provide for their folded and extended positions, and a tension cable operatively connected with a plurality of said panels at points so spaced relative to the axis of pivotal connection thereof that the force exerted by said cable tends to straighten said panels.

40. In a folding partition, the combination with an opening, of a guideway extending substantially the width of said opening, a series of partition panels mounted for opening and closing movement along said guideway, said panels adapted to be folded together in a folding zone at one side of said opening, a movable jamb structure at the latter side of said opening, and means for shifting said movable jamb structure into and out of engagement with the innermost panel when the partition is extended.

41. In a folding partition, the combination with an opening, of a guideway extending substantially the width of said opening, a series of partition panels mounted for opening and closing movement along said guideway, said panels adapted to be folded together in a folding zone at one side of said opening, a movable jamb structure at the latter side of said opening shiftable into and out of engagement with the innermost panel when the partition is extended, means for raising and lowering said partition in its extended position, and means controlled by the initial movement of said raising and lowering mechanism for shifting said movable jamb structure.

42. In a folding partition, the combination with an opening, of a guideway extending substantially the width of said opening, a series of partition panels movable outwardly along said guideway to extended position and movable inwardly along said guideway to folded position at one side of said opening, lowering mechanism operative to effect downward movement of said panels when the partition is in extended position, a confining member adapted to lie alongside certain of said panels when the panels are in said extended position, a jamb structure at said one side of the opening and including a part movable into and out of contact with the innermost panel when the partition is in extended position, and means responsive to said lowering mechanism for shifting said movable jamb part out of engagement with the innermost panel and for moving said confining member to a non-interfering position preparatory to causing said panels to be swiveled relative to said guideway.

43. In a partition the combination of an upper guideway, hangers movable along the upper guideway, partition panels yieldably suspended from said hangers and movable therewith to and from extended position, and means reacting against said upper guideway for forcing the panels downwardly against the pressure of said yieldable means so as to seal the lower edges of the panels against the floor.

44. In combination, an overhead track, means of supporting yieldingly a door from said track, yielding supporting means therefor, and means actuated by the closing of the door through its movement on the track for overcoming said yielding supporting means and forcing the door downwardly into engagement with the floor.

45. In combination, an overhead track suspended from a ceiling, a trolley having a depending stem mounted on said track, a door, means to yieldingly and pivotally support said door on said stem, and means between the top of the door and the track for engaging with said door to compress the yielding means and lower the door into engagement with the floor.

46. In combination, an overhead track suspended from a ceiling, a trolley having a depending stem mounted on said track, a door, means to yieldingly and pivotally support said door on said stem, means between the top of the door and the track for engaging with said door to compress the yielding means and lower the door into engagement with the floor, and means associated with the end of the door for causing said lowering means to operate when the door is being brought to its closing position.

47. In combination, a plurality of door leaves laterally hinged to form a partition when in an extended position, a common track, means of pivotally supporting each of said doors from said track, a yielding means for supporting said doors with respect to said track so that the bottoms of the doors are out of engagement with the floor, and means engageable by one of the doors upon the doors assuming a closing position for overcoming said yielding means and forcing the bottoms of the doors into engagement with the floor.

48. In combination, a door, a track, bracket means for supporting the track, an operating member pivotally supported by said bracket means adjacent said track, means for yieldingly supporting the door from the track, and means for actuating said operating member for causing the latter to act against the door and lower the same into engagement with the floor.

49. In combination, a plurality of lateral hinged door leaves adapted in open position to form a partition, a track, means for supporting said track, means for pivotally supporting each of said leaves from said track, an inclosure for said track supporting means and the tops of said doors, and means to pivot at least a portion of said inclosing means to permit it to be opened and closed to accommodate opening and closing movements of the door leaves.

50. In combination, a plurality of lateral hinged door leaves adapted in open position to form a partition, a track, yielding means for pivotally supporting each of said leaves from said track, an inclosure for said track supporting means and the tops of said doors, means to pivot at least a portion of said inclosing means to permit it to be opened and closed when the door leaves are being opened and closed, and means for overcoming said yielding means when the doors are moved to closing position to cause the lowering of all of the doors.

51. In combination, a plurality of lateral hinged door leaves adapted in open position to form a partition, a track, yielding means for pivotally supporting each of said leaves from said track, a lowering bar carried alongside said track, means carried by said door leaves for engagement with said lowering bar, and means for actuating the latter to cause the lowering bar to engage said door carried means and overcome said yielding means when the doors are moved to closing position to cause the lowering of all of the doors.

52. In combination, a plurality of lateral hinged door leaves adapted in open position to form a partition, a track, yielding means for pivotally supporting each of said leaves from said track, a lowering bar disposed alongside said track, means supporting the lowering bar for generally vertical movement including a plurality of swinging links, means on the door leaves for engagement by said lowering bar, and means for actuating the latter to cause the doors to lower against said yielding means.

53. In combination, a plurality of door leaves adapted when extended to form a partition and normally held out of engagement with the floor in moving from one position to another, and means for raising and lowering said door leaves into and out of floor engaging position, comprising a longitudinally extending member connected with the door leaves, a plurality of generally parallel swinging links supporting said longitudinal member and adapted when said member is shifted longitudinally to cause the same to raise and lower, and means for actuating said longitudinal member to lower said door leaves into engagement with the floor.

54. In combination, a plurality of door panels adapted when extended to form a partition or the like for the doorway, an upper stationary support disposed adjacent the upper portion of said doorway, a longitudinally movable member disposed under said stationary support and along the upper edges of said panels, parallel swinging links pivoted to said stationary support and carrying said longitudinal member, means carried by said panels and engageable with said longitudinal member, and mechanism connected with said longitudinal member and reacting through said links against said stationary support and through said panel carried means for raising and lowering said panels out of and into engagement with the floor.

55. In combination, a plurality of door panels adapted when extended to form a partition or the like for the doorway, an upper stationary support disposed adjacent the upper portion of said doorway, a longitudinally movable member disposed under said stationary support and along the upper edges of said panels, parallel swinging links pivoted to said stationary support and carrying said longitudinal member, means carried by said panels and engageable with said longitudinal member, and mechanism connected with said longitudinal member and reacting through said links against said stationary support and through said panel carried means for raising and lowering said panels out of and into engagement with the floor, said swinging links being movable downwardly past a dead-center relationship with respect to their pivotal connection with said stationary support so as to maintain said door panels in their lowered position.

56. In combination, a plurality of door panels adapted when extended to form a partition or the like for the doorway, an upper stationary support disposed adjacent the upper portion of said doorway, a longitudinally movable member disposed under said stationary support and along the upper edges of said panels, parallel swinging links pivoted to said stationary support and carrying said longitudinal member, means carried by said panels and engageable with said longitudinal member, mechanism connected with said longitudinal member and reacting through said links against said stationary support and through said panel carried means for raising and lowering said panels out of and into engagement with the floor, and spring means disposed along the upper edges of said panels for urging the latter into their raised position.

57. In combination, a plurality of door panels movable into extended position to form a partition for a doorway, track means supporting said panels for movement into and out of said extended position, a roller carried by each of said panels, and a longitudinally disposed lowering bar engageable with said rollers for forcing said panels downwardly into floor-engaging position.

58. In combination, a door, an overhead track, means for yieldingly supporting the door from said track, and means movable longitudinally of the track for overcoming said yielding supporting means and forcing the door downwardly into engagement with the floor.

59. In combination, an overhead track, a door, means for yieldingly supporting the door from said track, a part connected with and movable vertically with said door, and means movable generally longitudinally of said track and engageable with said vertically movable part for forcing the door downwardly into engagement with the floor.

60. In a door construction, the combination of a guideway, a plurality of door panels adapted when extended to form a partition for a doorway, means yieldingly supporting said panels on said guideway for generally vertical movement relative thereto and generally longitudinal movement into and out of their extended position, and lowering means acting against all of said panels and reacting against the upper portion of said doorway for forcing the panels downwardly against the pressure of said yieldable supporting means.

61. In a door construction, the combination of a guideway, a series of door panels movable along said guideway, means for holding said panels elevated when moving between their closed and extended positions, and lowering mechanism including a generally horizontally movable part operative to overcome said holding means and effect concurrent downward movement of said panels when in their extended positions.

62. In a door construction, the combination of a guideway, a series of door panels movable along said guideway to their closed and extended positions, said panels being also movable vertically, lowering mechanism for lowering said panels when in one of their positions, and yieldable means cooperating with said lowering mechanism and arranged to yield when said panels have reached their lowermost positions.

63. In a door construction, the combination of a series of door panels, a guideway along which said panels are movable, means for holding said panels elevated while moving between their retracted and extended positions, lowering mechanism associated with said guideway and operative to effect concurrent downward movement of said panels when in one of their positions, and a connection between said lowering mechanism and said panels providing for relative movement therebetween when said panels are in engagement with the floor, so as to accommodate unevenness of the floor and the like.

MALCOLM L. JONES.